US010021677B2

(12) United States Patent
Mallik et al.

(10) Patent No.: US 10,021,677 B2
(45) Date of Patent: Jul. 10, 2018

(54) TWO-STAGE PDCCH WITH DCI FLAG AND DCI FORMAT SIZE INDICATOR

(71) Applicant: QUALCOMM Incorporated, San Diego, CA (US)

(72) Inventors: Siddhartha Mallik, San Diego, CA (US); Taesang Yoo, Riverside, CA (US); Arumugam Chendamarai Kannan, San Diego, CA (US); Yongbin Wei, La Jolla, CA (US); Jelena Damnjanovic, Del Mar, CA (US); Durga Prasad Malladi, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 14/882,165

(22) Filed: Oct. 13, 2015

(65) Prior Publication Data
US 2016/0128028 A1 May 5, 2016

Related U.S. Application Data

(60) Provisional application No. 62/073,700, filed on Oct. 31, 2014, provisional application No. 62/096,412, filed on Dec. 23, 2014.

(51) Int. Cl.
*H04W 72/04* (2009.01)
*H04L 1/18* (2006.01)
*H04L 5/00* (2006.01)

(52) U.S. Cl.
CPC ......... *H04W 72/042* (2013.01); *H04L 1/1861* (2013.01); *H04L 5/0053* (2013.01); *H04W 72/0446* (2013.01); *H04L 5/0091* (2013.01)

(58) Field of Classification Search
CPC ... H04W 72/042; H04L 1/1861; H04L 5/0053
See application file for complete search history.

(56) References Cited

U.S. PATENT DOCUMENTS

| | | | |
|---|---|---|---|
| 2010/0111226 A1* | 5/2010 | Ko | H04B 7/0639 375/299 |
| 2010/0172295 A1* | 7/2010 | Sagfors | H04W 52/146 370/328 |

(Continued)

FOREIGN PATENT DOCUMENTS

EP     2 373 106 A1     10/2011

OTHER PUBLICATIONS

International Search Report and Written Opinion—PCT/US2015/055602—ISA/EPO—dated Jan. 20, 2016. (13 total pages).

(Continued)

*Primary Examiner* — Siming Liu

(57) ABSTRACT

Methods, systems, and devices are described for wireless communication employing two-stage control channel messaging. Systems, methods, and apparatuses for two stage two-stage physical downlink control channel (PDCCH) with a downlink control information (DCI) flag and DCI format size indicator are described. For instance, the present disclosure presents an example method of wireless communication at a wireless device, which may include receiving, at a first bandwidth and during a transmission time interval (TTI), a first control channel message. In addition, the example method may include determining, based on a flag in the first control channel message, whether a second control channel message is present in the TTI. Furthermore, the example method may include receiving, at a second bandwidth, the second control channel message where the flag indicates that the second control channel message is present for the TTI.

55 Claims, 19 Drawing Sheets

(56) References Cited

U.S. PATENT DOCUMENTS

| | | | | |
|---|---|---|---|---|
| 2011/0228732 A1* | 9/2011 | Luo | ................... | H04L 5/001 |
| | | | | 370/329 |
| 2011/0243066 A1* | 10/2011 | Nayeb Nazar | .......... | H04L 1/007 |
| | | | | 370/328 |
| 2013/0114525 A1* | 5/2013 | Ahmadi | ............... | H04L 5/0053 |
| | | | | 370/329 |
| 2013/0301597 A1 | 11/2013 | Kim et al. | | |

OTHER PUBLICATIONS

ZTE: "Primary and Secondary PDCCH Design for LTE-A", 3GPP Draft, R1-092227, Primary and Secondary PDCCH Design for LTE-A, 3rd Generation Partnership Project (3GPP), Mobile Competence Centre, 650, Route Des Lucioles, F-06921 Sophia-Antipolis Cedex, France, No. San Francisco, USA, 20090507, May 7, 2009 (May 7, 2009), pp. 1-12, XP050339649, [retrieved on May 7, 2009] pp. 3,4,7.

* cited by examiner

TWO-STAGE PDCCH WITH DCI FLAG AND DCI FORMAT SIZE INDICATOR

CROSS-REFERENCE TO RELATED APPLICATIONS

The present Application for Patent claims priority to Provisional Application No. 62/073,700 entitled "DUAL TIME SCALE CONTROL INFORMATION STRUCTURE FOR PDCCH" filed Oct. 31, 2014, and Provisional Application No. 62/096,412 entitled "TWO STAGE PDCCH WITH DCI FLAG AND DCI FORMAT SIZE INDICATOR" filed Dec. 23, 2014, both of which are assigned to the assignee hereof and hereby expressly incorporated by reference herein.

BACKGROUND

Field of Disclosure

The following relates generally to wireless communication, and more specifically to two-stage physical downlink control channel (PDCCH) with downlink control information (DCI) flag and DCI format size indicator.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In many multiple-access communications systems, control information is transmitted by a base station to UEs during a first symbol or group of symbols in a transmission time interval (TTI). But as the length of a TTI is shortened, the processing overhead required for a UE to decode the control information may increase. Transmission of control information may thus be modified to account for such increases in overhead.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Systems, methods, and apparatuses for two-stage PDCCH with a DCI flag and DCI format size indicator are presented in the present disclosure. In some examples, downlink control information may be transmitted in several messages, so a UE may receive a first control channel message during a TTI that includes a flag indicating the presence of a second control channel message for the TTI and an indication of a second control channel message payload size. The UE may identify the second control channel message based on a payload size indicated in the first control channel message. The control channel messages may be sent in a common TTI, or they may be sent in several TTIs. A base station may configure the first control channel message to include an indication of a second control channel message payload size, and the base station may configure the second control channel message based on the payload size indicated in the first control channel message. The control channel messages may be configured based on a format of a transmission periodicity, or both. A UE may identify or receive the first and second control channel messages based on the format of those messages or a transmission periodicity of the messages, or both.

For instance, the present disclosure presents an example method of wireless communication, which may include receiving, at a first bandwidth and during a TTI, a first control channel message. In addition, the example method may include determining, based on a flag in the first control channel message, whether a second control channel message is present in the TTI. Furthermore, the example method may include receiving, at a second bandwidth, the second control channel message where the flag indicates that the second control channel message is present for the TTI.

In addition, the disclosure presents an example method of wireless communication, which may include determining whether to add a flag to a first control channel message in a TTI based on whether a second control channel message is to be transmitted during the TTI. Additionally, the method may include transmitting the first control channel message at a first bandwidth and transmitting the second control channel message at a second bandwidth during the TTI.

The disclosure further presents an apparatus for wireless communication, which may include means for receiving, at a first bandwidth and during a TTI, a first control channel message. In addition, the apparatus may include means for determining, based on a flag in the first control channel message, whether a second control channel message is present in the TTI. Also, the example apparatus may include means for receiving, at a second bandwidth, the second control channel message where the flag indicates that the second control channel message is present for the TTI.

Moreover, the disclosure presents an apparatus for wireless communication, which may include means for determining whether to add a flag to a first control channel message in a TTI based on whether a second control channel message is to be transmitted during the TTI. Furthermore, the example apparatus may include means for transmitting the first control channel message at a first bandwidth and means for transmitting the second control channel message at a second bandwidth during the TTI.

In a further aspect, the disclosure presents an example apparatus for wireless communication, which includes a processor, memory in electronic communication with the processor, and instructions stored in the memory. The instructions may be executable by the processor to receive, at a first bandwidth and during a TTI, a first control channel message. The instructions may also be executable by the processor to determine, based on a flag in the first control channel message, whether a second control channel message is present in the TTI. Furthermore, the instructions may be executable by the processor to receive, at a second bandwidth, the second control channel message where the flag indicates that the second control channel message is present for the TTI.

The disclosure also presents an example apparatus for wireless communication, which may include a processor, memory in electronic communication with the processor, and instructions stored in the memory. The instructions are executable by the processor to determine whether to add a flag to a first control channel message in a TTI based on whether a second control channel message is to be transmitted during the TTI. In addition, the instructions may be executable by the processor to transmit the first control channel message at a first bandwidth and to transmit the second control channel message at a second bandwidth during the TTI.

Furthermore, the disclosure presents an example non-transitory computer-readable medium storing code for wireless communication, the code including instructions executable to receive, at a first bandwidth and during a TTI, a first control channel message. The code may also include instructions executable to determine, based on a flag in the first control channel message, whether a second control channel message is present in the TTI. Additionally, the code may include instructions executable to receive, at a second bandwidth, the second control channel message where the flag indicates that the second control channel message is present for the TTI.

Moreover, the disclosure presents a further example non-transitory computer-readable medium storing code for wireless communication, the code including instructions executable to determine whether to add a flag to a first control channel message in a TTI based on whether a second control channel message is to be transmitted during the TTI. The code may also include instructions executable to transmit the first control channel message at a first bandwidth and to transmit the second control channel message at a second bandwidth during the TTI.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
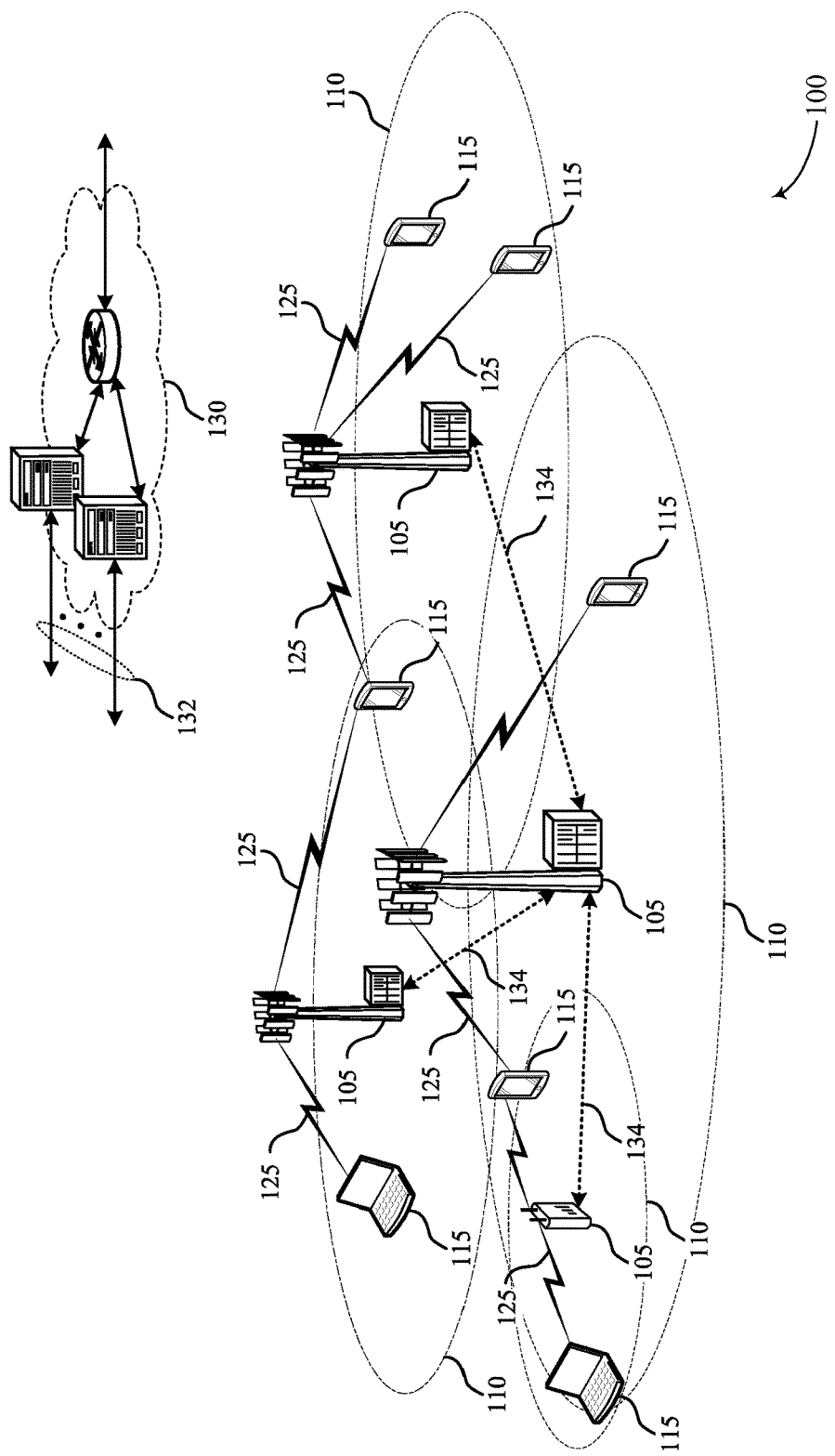
FIG. 1 illustrates an example of a wireless communications system for two-stage physical downlink control channel (PDCCH) with downlink control information (DCI) format size indicator in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can be a RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

In wireless communication systems employing legacy LTE, a TTI has a fixed length of one millisecond, which corresponds to one subframe in the current LTE frame structure. During each subframe, control information is transmitted by a network entity (e.g., an eNodeB or base station) to one or more UEs during a first symbol or group of symbols in the subframe. This control information includes downlink or uplink bandwidth grant information for one or more of the UEs for the subframe. As the length of a TTI is shortened, however, the processing load associated with sending control information during each TTI increases. According to aspects of the present disclosure, system performance may be enhanced by employing a two-state, or dual time scale control channel (e.g., PDCCH). For instance, the payload of a control channel, such as PDCCH, may be split into two portions: a "fast PDCCH" portion and a "slow PDCCH" portion. In order to reduce processing overhead, information about the slow PDCCH portion may be conveyed to a UE in the fast PDCCH portion.

The fast PDCCH portion—which may be referred to as "fast PDCCH," "fast PDCCH control information," "fast control channel," "fast control channel message," a message having "fast channel format," or the like—may include information that may be updated and transmitted in each TTI or for every downlink or uplink grant. The fast PDCCH may, for example, include hybrid automatic repeat request (HARQ) information, changes in modulation and coding scheme (MCS) information, or the like. The slow PDCCH portion, which may be referred to as "slow PDCCH," "slow control channel," "slow PDCCH control information," "slow control channel message," a message having "slow channel format," or the like—may include information that may be updated and transmitted less frequently than the fast PDCCH. For instance, the slow PDCCH may be updated every two, or more, TTIs. The slow PDCCH may, for example, include baseline MCS or rank indicator (RI) information for downlink or uplink grants, precoder information, coarse resource block (RB) allocation information, channel quality information (CQI) requests, power control command information, or the like.

In an aspect of the present disclosure, the fast PDCCH payload may indicate the presence of a slow PDCCH portion in a given TTI. Therefore, in each TTI, a UE of the present disclosure may decode the fast PDCCH payload and may determine, based on an indicator, or "flag," in the fast PDCCH payload, whether a slow PDCCH portion is present in the TTI for decoding. Furthermore, in an additional aspect, the bandwidth location of the slow PDCCH portion may be fixed in relation to the fast PDCCH payload. Thus, though the indicator may include a specific bandwidth location of the slow PDCCH, an indication of the specific bandwidth location is not necessary. Additionally, where a slow PDCCH portion is not present during a given TTI, the UE may utilize previously received or decoded (e.g., the most recently received or decoded) slow PDCCH information for the TTI. In other words, the slow PDCCH information from a prior TTI may be "carried over" to one or more subsequent TTIs where the fast PDCCH payload in each of the subsequent TTIs does not indicate the presence of a slow PDCCH portion in that TTI.

By utilizing the split PDCCH payload structure of the present disclosure, control information may be transmitted more efficiently in systems utilizing relatively short TTIs, as the amount of data transmitted per TTI may be minimized by reusing slow PDCCH information over several TTIs. Likewise, over-the-air latency can be lessened given the lowered quantity of data that must be decoded by a UE during each TTI. Furthermore, the instances during which the UE monitors the common search space in a TTI can be minimized given the static bandwidth location of a fast PDCCH portion in each TTI. In other words, by restricting the location of the fast PDCCH, the number of blind decodes performed by a UE in a given TTI can be lowered.

Furthermore, the payload of the fast PDCCH may be small relative to the payload of the slow PDCCH. In some examples, the fast PDCCH payload is 10-12 bits and does not vary between TTIs. While, in some examples, the slow PDCCH payload is 20-30 bits, and the size of the slow PDCCH payload may depend on the configured transmission mode. This variable payload size of the slow PDCCH portion may help improve control channel capacity. For instance, a base station, or other network entity, may increase the number of UEs that can be concurrently scheduled with a given number of control channel resources. The variable payload size may, however, increase the decoding complexity for each UE because, without any additional information, a UE may attempt a blind decode for each new payload size, and increasing the number of blind decodes may increase the number of false alarms in decoding.

Thus, in order to reduce the blind decode complexity, the fast PDCCH payload of the present disclosure may include an indication of the slow PDCCH payload size. As described below, this may include a "slow payload indicator bitmap" (SPIB) incorporated into the fast PDCCH payload. This indicator (e.g., SPIB) may apply to the payload of the slow PDCCH payload in the current TTI or a subsequent TTI, or both. A fast PDCCH payload may thus carry an indicator about a slow PDCCH payload transmitted within the same TTI, or the fast PDCCH payload may provide information to the UE about slow PDCCH payloads in other TTIs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Time intervals in LTE may be expressed in multiples of a basic time unit (e.g., the sampling period, Ts=1/30,720,000 seconds). Time resources may be organized according to radio frames of length of 10 ms (Tf=307200·Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, which may also be referred to as a TTI. In other cases, a TTI may be shorter than a subframe and may be dynamically selected (e.g., in short TTI bursts or in selected component carriers using short TTIs). As described below, the system 100 may employ TTIs that are shorter in duration than an LTE subframe. TTIs of carriers within the system 100 may, for example, be on the order of tens of microseconds.

Data may be divided into logical channels, transport channels, and physical layer channels, as recognized by those skilled in the art. DL physical channels may include physical broadcast channel (PBCH) for broadcast information, physical control format indicator channel (PCFICH) for control format information, PDCCH for control and scheduling information, physical HARQ indicator channel (PHICH) for HARQ status messages, physical downlink shared channel (PDCCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data. In examples in which short-duration TTIs are used (e.g., TTIs on the order of tens of microseconds), control channel (e.g., PDCCH) messages may be sent in two stages. This may be referred to as splitting a PDCCH payload. DL transmissions may thus include a fast PDCCH payload or a slow PDCCH payload, or both, which may be sent in a common or different TTIs.

PDCCH may carry DCI in control channel elements (CCEs), which may consist of logically contiguous resource element groups (REGs), where each REG contains resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. In two-stage PDCCH, certain DCI may be formatted as fast PDCCH and other DCI may be formatted as slow PDCCH. For instance, fast PDCCH payload may have first control channel message format which may include information updated at one rate, while a slow PDCCH payload may have a second control channel message format updated at a different rate. The first control channel message format may include information fields for HARQ or changes in MCS information, which may be updated more frequently than other DCI. The second control channel message format may, for instance, include information fields for MCS, RI, precoder, coarse RB allocation, CQI request, power control command, or similar information.

PDCCH can carry DCI messages associated with multiple users, and each UE 115 may decode the DCI messages that are intended for it. For example, each UE 115 may be assigned a cell radio network temporary identity (C-RNTI) and CRC bits attached to each DCI may be scrambled based on the C-RNTI. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful. Two-stage PDCCH described herein may reduce blind decode complexity by, for instance, indicating to a given UE 115 whether a slow PDCCH payload is present in a particular TTI, and, if so, a size of the slow PDCCH payload. For example, an indication in a fast PDCCH payload may provide information about one or more of a presence, size, or content of a slow PDCCH payload, which may indicate to the UE 115 how it should interpret the slow PDCCH payload.

In some examples of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

The system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A carrier may also be referred to as a CC, a layer, a channel, or the like. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth (e.g., higher data rates). Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station 105 utilizing multiple carriers, and may also communicate with multiple base stations simultaneously on different carriers. Each cell of a base station 105 may include an UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In some examples, a CC configured for a UE 115 may be an eCC. An eCC may, for example, have short-duration TTIs (e.g., TTIs having a duration of tens of microseconds) or may include symbols of different duration than other CCs. In some examples, two-stage PDCCH with DCI format indicator—e.g., a fast PDCCH payload with SPIB and a slow PDCCH payload—are employed over an eCC when the eCC is configured for a UE. An eCC may utilize unlicensed spectrum, and may be otherwise configured such that it is not compatible with the legacy UEs 115 described above.

Broadly speaking, the unlicensed spectrum in some jurisdictions may range from 600 Megahertz (MHz) to 6 Gigahertz (GHz). As used herein, the term "unlicensed spectrum" or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5G band. By contrast, the term "licensed spectrum" or "cellular spectrum" may be used herein to refer to wireless spectrum utilized by wireless network operators under administrative license from a governing agency.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands. An eCC may utilize subcarriers of different spacing than other LTE carriers.

In some cases, a UE 115 may be served by cells from two or more base stations 105 that are connected by a non-ideal backhaul 134 in dual connectivity operation. For example, the connection between the serving base stations 105 may not be sufficient to facilitate precise timing coordination. Thus, in some cases, the cells serving a UE 115 may be divided into multiple timing adjustment group (TAGs). Each TAG may be associated with a different timing offset, such that the UE 115 may synchronize UL transmissions differently for different UL carriers. A UE 115 configured with an eCC may be in a dual connectivity operation, for instance.

HARQ may be a method of ensuring that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). Lower latency HARQ operation may be realize by utilizing shorter-duration TTIs. Because two-stage PDCCH may facilitate short-duration TTI deployments, two-stage PDCCH may also allow for systems to take advantage of other benefits of short-duration TTIs, such as lower-latency HARQ.

According to the present disclosure, a UE 115 may thus receive a first control channel message (e.g., a fast PDCCH payload), which may include an indication of a presence of a second control channel message payload (e.g., a slow PDCCH payload) in a given TTI. In addition, the first control channel message may include an indication of a second control channel message payload size. The UE 115 may identify the second control channel message based on the payload size indicated in the first control channel message. Likewise, a base station 105 may configure the first control channel message within the indication of the second control channel message payload size, and it may configured the second control channel message accordingly.

Figure 2:
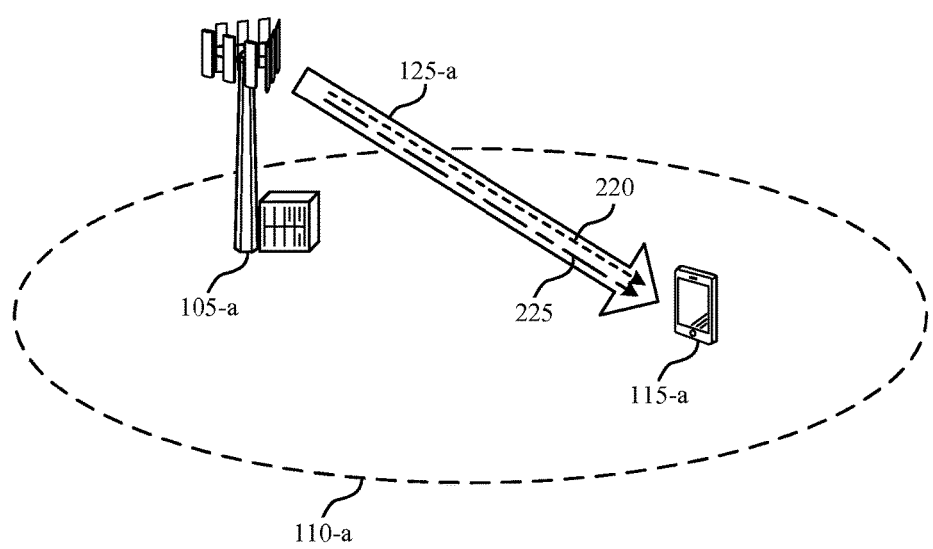
FIG. 2 illustrates an example of a wireless communications system for two-stage PDCCH with DCI flag and DCI format size indicator in accordance with various aspects of the present disclosure.

Next, FIG. 2 illustrates an example of a wireless communications system 200 for two-stage PDCCH with DCI flag and DCI format size indicator in accordance with various aspects of the present disclosure. For purposes of the present disclosure, the DCI flag may be referred to simply as a "flag." Wireless communications system 200 may include a UE 115-a, which may be an example of a UE 115 described above with reference to FIG. 1. Wireless communications system 200 may also include a base station 105-a, which may be an example of a base station 105 described above with reference to FIG. 1. Base station 105-a may be configured to control bandwidth allocation of one or more UEs by generating and transmitting bandwidth grants and other control information to the one or more UEs 115 in a first control channel message 220 and, potentially, a second control channel message 225 in a TTI. Similarly, UE 115 may be configured to obtain control information in a first control channel message 220 and, potentially, a second control channel message 225 in a given TTI.

The base station 105-a configures first control channel message 220 and second control channel message 225, which the base station 105-a may transmit to UE 115-a via communication link 125-a. The first control channel message 220 may include a flag that indicates whether the second control channel message 225 is present in the TTI. In addition, in some examples, the first control channel message 220 may include an indication of the payload size or contents, or both, of the second control channel message 225. The UE 115-a may thus receive the first control channel message 220, and the UE 115-a may determine, based on the flag, whether the second control channel message 225 is present for the TTI. In addition, the UE 115-a may identify the second control channel message 225 based, to some degree, on the payload size indicated in the first control channel message 220. The control channel messages may be a two-stage PDCCH, and may include a fast PDCCH payload and a slow PDCCH payload as described above.

In some examples, the flag may be a single- or multi-bit value in the first control channel message 220 included in each first control channel message in each TTI, the value of which indicates whether the second control channel message 225 is present for the TTI. In some non-limiting examples, the flag may be appended to the first control channel message 220 only where In some examples, the indication of the second control channel message 225 payload size is conveyed with a slow payload indicator bitmap (SPIB). The first control channel message 220 payload may include fewer bits than the second control channel message 225 payload, but among the bits of the first control channel message 220 payload may be the SPIB. For instance, two bit of the first control channel message 220 payload may be used to convey size or content information about the second control channel message 225 payload.

A variety of bit maps may be used, but several possible examples are described here. In the example illustrated of Table 1, two bits are used to indicate the slow PDCCH payload size.

TABLE 1

| SPIB | Slow PDCCH Payload Size |
|------|-------------------------|
| 00   | 20 bits                 |
| 01   | 25 bits                 |
| 10   | 30 bits                 |
| 11   | 35 bits                 |

In the example of Table 2, two bits are used to indicate a range of slow PDCCH payload sizes.

TABLE 2

| SPIB | Slow PDCCH Payload Size(s) |
|------|----------------------------|
| 00   | 20 bits                    |
| 01   | 20 or 25 bits              |
| 10   | 20, 25, or 30 bits         |
| 11   | 20, 25, 30, or 35 bits     |

Next, in the example of Table 3, an SPIB is used to indicate both a payload size and information about the contents of the payload.

TABLE 3

| SPIB | Slow PDCCH Payload Size/Content |
|------|---------------------------------|
| 00   | 15 bits, RB allocation payload  |
| 01   | 15 bits, MCS payload            |
| 10   | 30 bits, RB allocation + MCS payload |
| 11   | 15 bits, RB allocation + CSI request payload |

Those skilled in the art will recognize that other indicators may be included into a first control channel message in order to indicate information (e.g., size or content) about a payload of a second control channel message. But the SPIB described in Tables 1-3 represent certain examples that a UE 115-a may receive in, for instance, a fast PDCCH payload, and that the UE 115-a may use to identify a slow PDCCH payload.

Figure 3A:
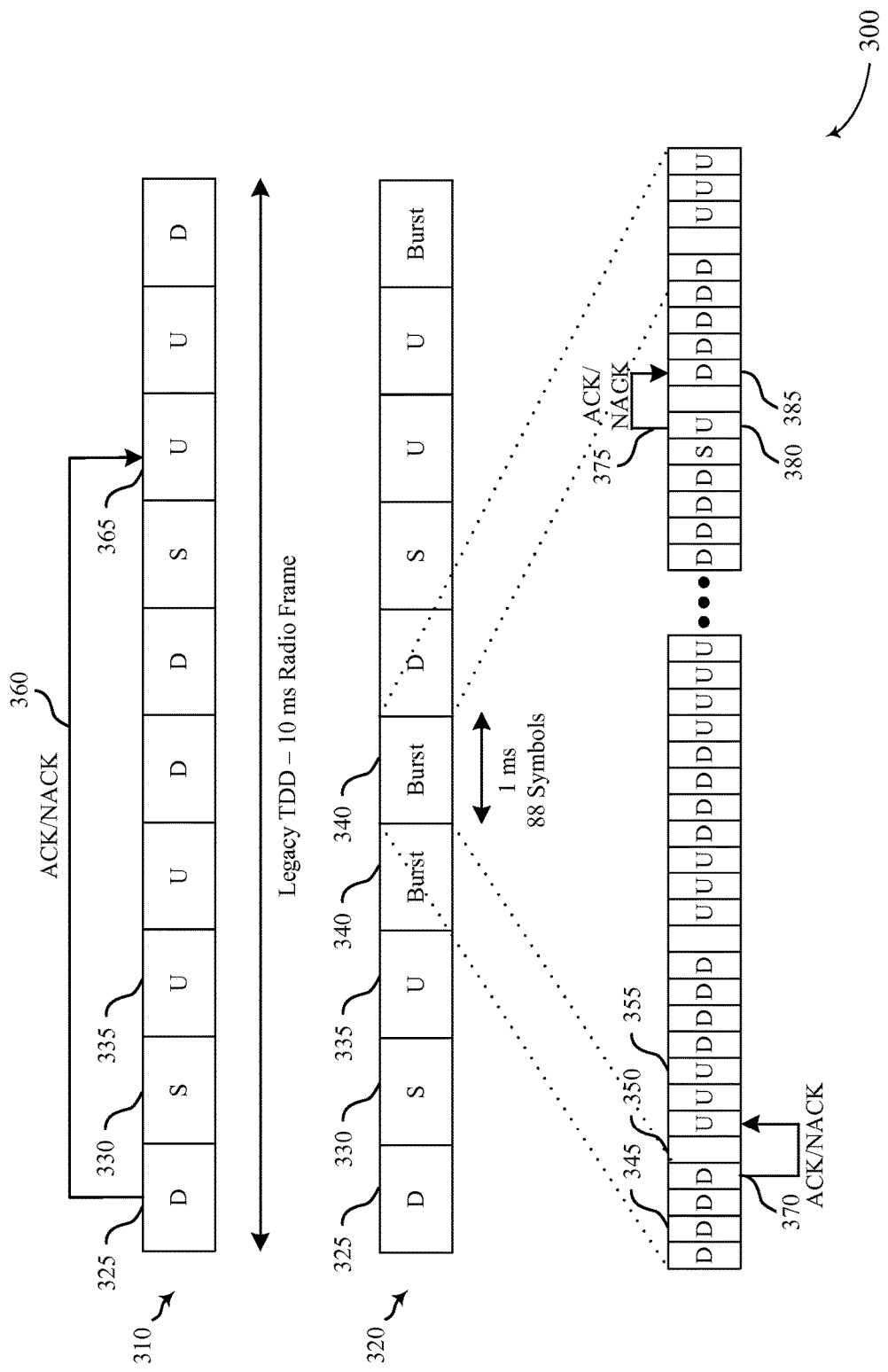
FIG. 3A illustrates an example of frame structures for two-stage PDCCH with DCI flag and DCI format size indicator with DCI flag and DCI format size indicator in accordance with various aspects of the present disclosure.

FIG. 3A illustrates an example block diagram 300 of frame structures for two-stage PDCCH with DCI flag and DCI format size indicator in accordance with various aspects of the present disclosure. The radio frames of FIG. 3A may be transmitted using portions of the wireless communications system 100 described with reference to FIG. 1 between one or more base stations 105 and one or more UEs 115, for example. In this example, a legacy PCell transmission 310 may include a TDD frame that include ten 1 ms subframes, including downlink subframes 325, special subframes 330, and uplink subframes 335. The downlink subframes 325, special subframes 330, and uplink subframes 335 may include a subframe structure defined according to established LTE standards, which may include 14 symbols within each 1 ms subframe. In some examples, downlink subframes 325 may include downlink orthogonal frequency division multiplexing (OFDM) symbols, uplink subframes may include single carrier frequency division multiplexing (SC- FDM) symbols, and special subframes 330 may include both uplink SC-FDM symbols and downlink OFDM symbols.

In the example of FIG. 3A, SCell transmissions 320 may include low latency or burst mode transmissions that may replace the legacy frame structure with a TDD-based frame structure that allows for dynamic switching between downlink and uplink symbols of shortened or variable TTI lengths. While the example of FIG. 3A shows the low latency or burst mode transmissions on a SCell, it will be understood that such transmission structures, as well as various of the techniques and principles described herein, may be implemented in other transmissions, such as within one or more burst mode subframes of a legacy LTE frame, in other PCell transmissions, in licensed or unlicensed spectrum or the like. In the example of FIG. 3A, the SCell may be an eCC, and the SCell transmissions 320, which may be referred to as eCC transmissions, may include designated downlink symbols 345 and designated uplink symbols 355, and flexible or special symbols 350 that may be allocated as uplink or downlink symbols, or used as a switching period, based on particular traffic needs.

The designated downlink symbols 345 and designated uplink symbols 355 may be provided to enable various radio resource management (RRM) measurements, synchronization, CSI feedback, random access channel (RACH) and scheduling request (SR) communications, for example. The designated downlink symbols 345 and designated uplink symbols 355 may be configured by a base station, such as base stations 105 of FIG. 1, with two-stage PDCCH with a DCI format indicator, and may be communicated to one or more UEs, such as UEs 115 of FIG. 1.

The symbols 345, 350, and 355 may provide for dynamic switching, such that a base station and UE are not required to look ahead in terms of a number of uplink or downlink subframes for an entire radio frame, but may determine particular resource allocations in a dynamic and flexible manner. The number of resources allocated for a particular UE may be determined, for example, on an amount of data to be transmitted between the UE and the base station, and a latency requirement or quality of service (QoS) requirement associated with the data. In some examples, each of the symbols 345, 350, and 355 may have a reduced symbol duration relative to the legacy OFDM or SC-FDM symbols and in some examples have a symbol duration of 11.36 μs per symbol, including a useful symbol duration of 8.33 μs and a cyclic prefix duration of 2.03 μs. SCell transmissions 320 may thus have eCC TTIs having symbols of shorter duration than the LTE symbols and TTIs of PCell transmissions 310. Symbols 345, 350, and 355 may have increased tone spacing for subcarriers relative to legacy symbols, and in some examples have a tone spacing of 120 kHz, and utilize a relatively wide bandwidth (e.g., 80 MHz).

Such shortened symbol duration and dynamic switching between downlink and uplink communications may allow for reduced ACK/NACK turn-around time, and may thus provide relatively low latency transmissions of data. In some examples, delay sensitive data may be transmitted using SCell transmissions 320, while other data that is not as delay sensitive may be transmitted using PCell transmissions 310.

For PCell transmissions 310, a UE 115 (FIGS. 1 and 2) may receive a DL transmission in DL subframe 325 and transmit an acknowledgement (ACK) according to a first layer HARQ scheme in which ACKs are transmitted in a first available subframe at or after k+4 subframes following the receipt of a DL transmission. In some cases, subframe k+4 from DL subframe 325 may be another DL subframe, and an ACK/NACK 360 may be transmitted in following UL subframe 365. Thus, in this example, there may be a 7 ms delay between DL subframe 325 and the ACK/NACK 360 associated with the subframe. In the event that a retransmission is appropriate (e.g., after receiving a NACK), the retransmission may be scheduled for a subsequent DL subframe. The retransmission timing may result in a relatively long round trip time (RTT) (e.g., a minimum of 11 ms). If an acknowledgment is sent in the fourth subframe following a DL transmission (in FDD mode ACK/NACK may be consistently transmitted in subframe k+4), the minimum RTT may be 8 ms.

As mentioned above, shorter duration TTIs may provide for lower latency HARQ. For instance, within burst subframes 340, the latency for providing ACKs may be less than the latency for transmissions in the first hierarchical layer. In some cases, transmissions using the second hierarchical layer may utilize similar HARQ techniques as with first layer transmissions. That is, ACKs may be provided in symbol k+4 (where k represents the original symbol transmission), or in a first available symbol for transmission afterward. In some cases, an offset other than 4 may be used for the second hierarchical layer. A UE 115 may receive a DL transmission in symbol 345 and provide an ACK/NACK 370 in UL symbol 355, which is five symbols after the receipt of DL transmission in DL symbol 345 (because the fourth symbol following the transmission is a special symbol 350). Thus, the UE 115 may provide ACK/NACK 370 of the DL transmission within the burst subframe 340, which is less than 1 ms following the receipt of the DL transmission in DL symbol 345. In some examples, the symbol duration (e.g., TTI) for symbols in the burst subframe 340 may be 11.36 μs, resulting in an acknowledgment being provided in this example 56.8 μs following the DL symbol 345 transmission. The eNB may then schedule any required retransmission and thus may provide, in some examples, a resulting RTT of approximately 100 μs or less.

While ACK/NACK 370 is described with respect to a UE 115 receiving a DL symbol 345, similar functions may be performed for UL transmissions. For example, a UE may transmit an UL symbol 380 to an eNB, which may be acknowledged by the eNB through ACK/NACK 375 that is provided in DL symbol 385. In the event that a retransmission is necessary, such a retransmission may be provided in a subsequent UL symbol from the UE and thus may again provide, in some examples, a resulting RTT of approximately 100 μs or less. Accordingly, latency associated with transmissions in burst subframes 340 may be significantly reduced. Such reduced latency may enable enhanced data rates, through reduced RTTs which may reduce overall retransmission times.

Figure 3B:
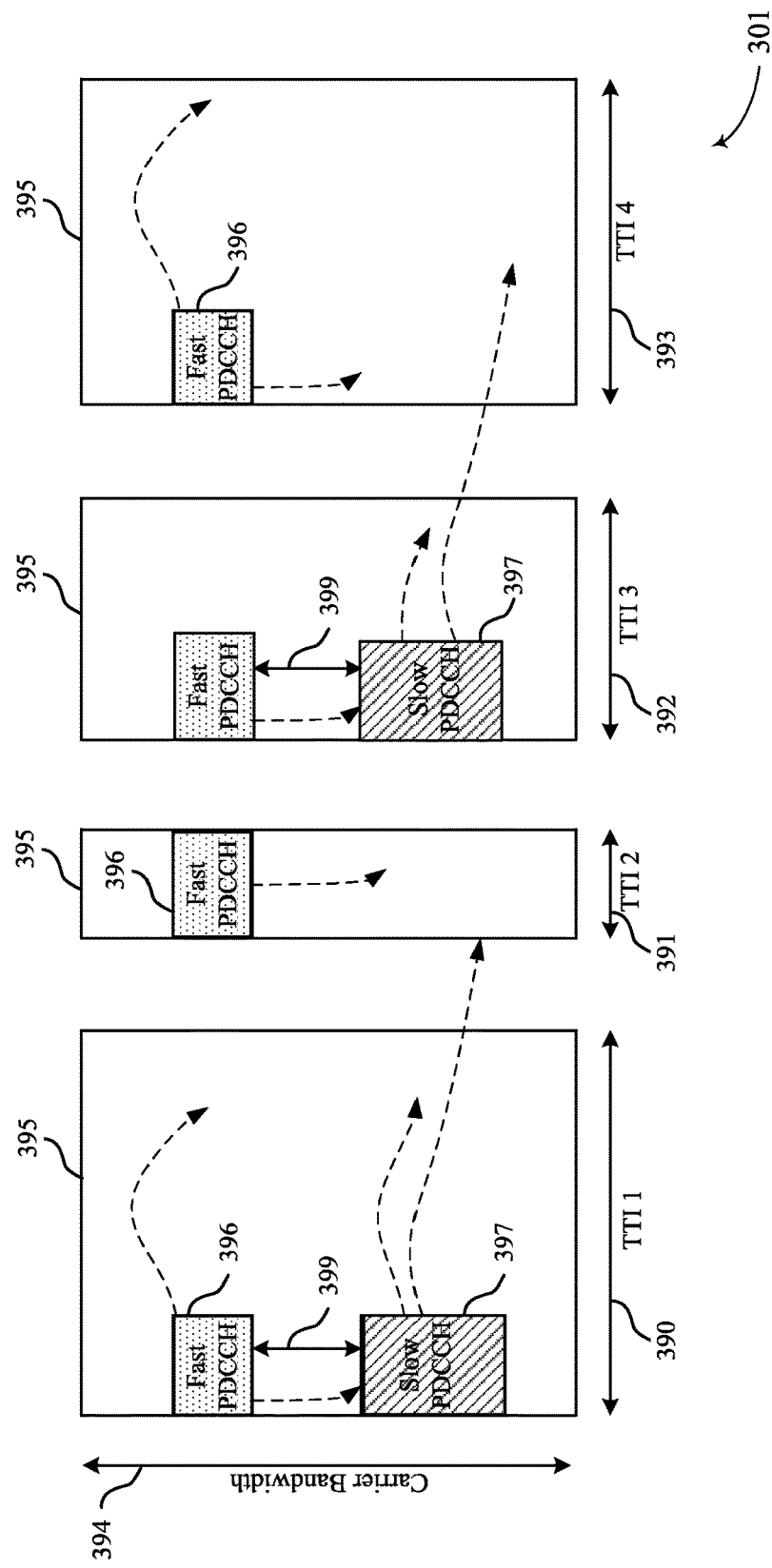
FIG. 3B illustrates an example of control channel transmissions in several TTIs for two-stage PDCCH with DCI flag and DCI format size indicator with DCI flag and DCI format size indicator according to the present disclosure.

In order to facilitate the shorter TTI duration, and thus the lower latency describe with reference to burst subframe 340, a two-stage PDCCH with DCI indication may be employed, as discussed above and further illustrated in FIG. 3B. In FIG. 3B, shown is an example of control channel transmissions in several TTIs 301 for two-stage PDCCH with DCI flag and DCI format size indicator according to the present disclosure. Each of the TTIs (TTIs 1-4) 390, 391, 392, and 393 may be examples of DL symbols 345 depicted in FIG. 3A. In some examples, the TTIs 390-393 are variable TTIs, which may be dynamically scheduled for uplink or downlink on frequency resources of carrier bandwidth 394. Each of the TTIs 390-393 may have a duration of tens of microseconds. Each TTI may constitute a frame, subframe, symbol, or any other unit into which data transmission is organized in one or both of downlink (e.g., PDSCH) or uplink (e.g., PUSCH) transmissions.

A base station 105 (FIGS. 1 and 2), or other network entity, may configure a two-stage PDCCH with a DCI flag and potentially a DCI size indicator. For instance, a base station 105 may configure a PDSCH 395, a fast PDCCH portion (also referred to herein as a "fast PDCCH payload") 396, which may be transmitted during every TTI, and a slow PDCCH portion (also referred to herein as a "slow PDCCH payload") 397, which may transmitted less frequently than every TTI. In other words, in some cases, the fast PDCCH payload 396 may include control information that is updated during every TTI, and the slow PDCCH payload 397 may be updated less frequently, as described above. For instance, as depicted in the example illustrated in FIG. 3B, the fast PDCCH portion 396 may be transmitted during TTIs 1, 2, 3, and 4 (390, 391, 392, and 393, respectively) whereas the slow PDCCH portion 397 is transmitted in only during TTI 1 390 and TTI 3 392. A UE 115 (FIGS. 1 and 2) may thus receive the fast PDCCH payload 396 in one TTI, and it may receive the slow PDCCH payload 397 in the same (or a subsequent TTI, though not shown in FIG. 3B).

Furthermore, the fast PDCCH portion 396 may include a flag that indicates whether the TTI includes a slow PDCCH portion 397. For example, the flag may be appended to each fast PDCCH portion 396 in each TTI and may be a single-bit value where a "1" value indicates that the TTI includes a slow PDCCH portion 397 and a "0" value indicates that the TTI does not include a slow PDCCH portion 397. In other examples, the flag may be a bit (e.g., having a "1" or "0" value) or multiple bits that may be appended to the fast PDCCH payload 396 only where the TTI includes (or does not include) the slow PDCCH portion. In an additional aspect, the slow PDCCH portion 397 may be offset from the fast PDCCH portion 396 by a bandwidth offset 399, which may be stored in each of the UEs in memory. As such, if the fast PDCCH payload 396 indicates that a slow PDCCH portion 397 is present in a TTI, the UE may query the memory to determine the bandwidth offset 399 and may decode the slow PDCCH portion 397 at the bandwidth corresponding to the bandwidth offset 399.

In a further aspect, where a fast PDCCH portion 396 in a particular TTI indicates that the TTI does not contain a slow PDCCH portion 397, the UE may utilize control information that was included in a previously received (e.g., a most recently received) slow PDCCH portion 397. In some examples, the UE may store control information included in a decoded slow PDCCH portion 397 for use in future TTIs that do not contain slow PDCCH information. In other words, in some examples, parameters or field values included in a slow PDCCH portion 397 may remain in effect until they are updated by a subsequent slow PDCCH portion 397. For example, in TTI 2 391, the fast PDCCH portion 396 indicates that the TTI does not include a slow PDCCH portion. As such, a UE may utilize the control information obtained and decoded in slow PDCCH portion 397 of TTI 1 390. Thereafter, in TTI 3 392, the fast PDCCH portion 396 indicates that TTI 3 392 includes slow PDCCH portion 397. As such, the UE may obtain and decode the slow PDCCH portion 397 in TTI 3 392 by using the offset 399 to determine the resource (i.e., bandwidth) location of slow PDCCH portion 397. Once the slow PDCCH portion 397 of TTI 3 392 is decoded, the UE may use the control information therein for the downlink transmission of TTI 3 392 and may replace the previously received (e.g., most recently received) slow PDCCH control information in its memory with that of slow PDCCH portion 397 of TTI 3 392. Like TTI 2 391, the fast PDCCH portion 396 of TTI 4 393 indicates that the TTI does not include a slow PDCCH portion. As such, a UE may utilize the control information obtained and decoded in slow PDCCH portion 397 of TTI 3 392.

The fast PDCCH portion 396 may include an indication of the size or content, or both, of the slow PDCCH portion 397, such as an SPIB as describe above with reference to Tables 1-3. For example, the fast PDCCH portion 396 may include two bits that correspond to one or more payload sizes of the slow PDCCH portion 397. The fast PDCCH payload 396 size may be fixed, while the slow PDCCH payload 397 size varies based on, or as a function of, a configured transmission mode. So certain DCI formats, as described above, may result in different payload sizes for slow PDCCH portion 397.

By way of example, the fast PDCCH portion 396 may include a relatively small payload (e.g., compared to that of slow PDCCH portion 397) that includes control information that may require updating on a per-TTI basis. In addition, the fast PDCCH portion 396 may include a cyclic redundancy check (CRC) portion (e.g., having a 16 bit length in some examples). In some cases, the fast PDCCH portion 396 may include a grant of resources of a TTI to a particular UE 115, which is represented in FIG. 3B by the dashed line from each fast PDCCH portion 396 to the PDSCH 395 in the respective TTI. For example, the grant may include a downlink grant or resource allocation for a PDSCH 395 for a particular UE in each TTI. In addition, the fast PDCCH portion 396 may include the SPIB, HARQ information, MCS change information, or the like.

The slow PDCCH portion 397 may include a relatively large payload (e.g., compared to that of fast PDCCH portion 396) that includes information updated less frequently than the fast PDCCH portion 396. The slow PDCCH portion 397 may also include one or more of MCS, RI, precoder power control commands, coarse RB allocation, CQI request information, or the like. In some cases, slow PDCCH portion 397 includes a CRC portion or grant information (as depicted with dashed arrows), or the like. Additionally or alternatively, the slow PDCCH portion 397 may include information regarding aggregation levels that the UEs are to monitor for the fast PDCCH portion 396.

A UE 115 may thus receive a first control channel message (e.g., a fast PDCCH payload 396), which may include a flag indicating the presence of a second control channel message (e.g., a slow PDCCH) in a particular TTI, and potentially an indication of a second control channel message payload (e.g., a slow PDCCH payload 397) size. The UE 115 may identify the second control channel message based on the payload size indicated in the first control channel message. Likewise, a base station 105 may configure the first control channel message within the indication of the second control channel message payload size, and it may configured the second control channel message accordingly.

Figure 4:
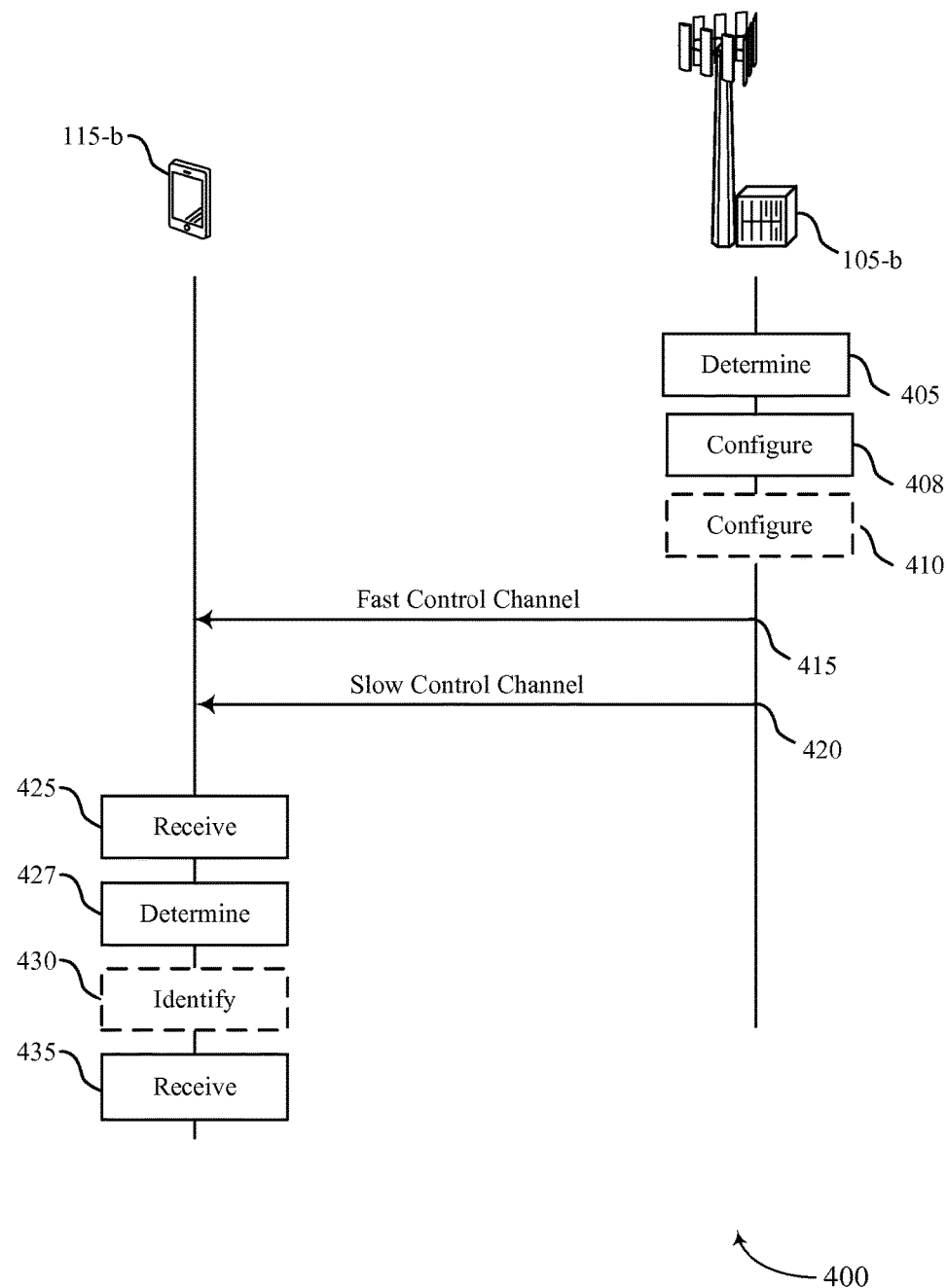
FIG. 4 illustrates an example of a process flow for two-stage PDCCH with DCI flag and DCI format size indicator with DCI flag and DCI format size indicator in accordance with various aspects of the present disclosure.

FIG. 4 illustrates an example of a process flow 400 for two-stage PDCCH with DCI flag and DCI format size indicator in accordance with various aspects of the present disclosure. Process flow 400 may include a UE 115-b, which may be an example of a UE 115 described above with reference to FIGS. 1 and 2. Process flow 400 may also include a base station 105-b, which may be an example of a base station 105 described above with reference to FIGS. 1 and 2.

At block 405, base station 105-b may determine whether to add a flag to a first control channel message in a TTI based on whether a second control channel message is to be transmitted to UE 115-b during the TTI. In an aspect, the base station 105-b may be configured to determine whether the second control channel message is to be transmitted to UE 115-*b* based on whether an update to control information associated with the second control channel message is available. In addition, at block 408, base station 105-*b* may configure the first control channel message to include the flag and, in some examples, an indication of a second control channel message payload size. Then, in an optional aspect indicated by the dashed lines at block 410, the base station 105-*b* may configure the second control channel message based on the payload size indicated, or to be indicated, in the first control channel message. This may be referred to as two-stage PDCCH with a DCI flag and DCI format indication, or it may be referred to as splitting PDCCH.

At step 415, base station 105-*b* may transmit the first control channel message in a TTI. The base station 105-*b* may, at block 420, transmit the second control channel message in the same TTI (or a subsequent TTI). In some examples, the messages are transmitted in a TTI an eCC having symbols of shorter duration than symbols of another component carrier CC. In some examples the first control channel message has a first control channel message format and the second control channel message has a second control channel message format that is different from the first control channel message format.

In some examples, the first control channel message is one of a plurality of messages of the same format. As discussed above with reference to FIG. 3B, the first control channel message may be a fast PDCCH transmitted in every or nearly every TTI. The base station 105-*b* may thus transmit a first plurality of control channel messages based on the fact that they of a first control channel message format (e.g., fast PDCCHs), and are transmitted according to a first transmission periodicity, which in turn is based on the DCI they contain. Likewise, the second control channel message may be one of a second plurality of messages of the same format—e.g., a slow PDCCH, as described with reference to FIG. 3B. The base station 105-*b* may thus transmit a second plurality of control channel messages based on the fact that they are of a second control channel message format (e.g., slow PDCCHs), and are transmitted according to a second transmission periodicity, which in turn is based on the DCI they contain, and which is less frequent than the first transmission periodicity. In other words, the first transmission periodicity may be less than the periodicity of the second transmission periodicity.

In some examples, the first control channel message format includes a first set of information fields corresponding to a first update rate; and the second control channel message format includes a second set of information fields corresponding to a second update rate. The first set of information fields may, for example, include HARQ information or MCS update information (e.g., delta MCS information), or the like, whereas the second set of information fields may include MCS information, RI information, precoder information, coarse RB allocation information, CQI request information, or power control command information.

As described above, the payload size of a control channel message of the first control channel message format is fixed from one TTI to a subsequent TTI. In some examples, the indication of the second control channel size may be two bits. A combination of the two bits may correspond to one or more payload sizes. Additionally or alternatively, the payload of the second control channel message includes more bits than a payload of the first control channel message. In some examples, the second control channel message payload size is a function of a configured transmission mode. In some examples, the indication of the second control channel message payload size further indicates a payload type. In some examples the payload type includes a RB allocation payload type, a MCS payload type, a CSI request payload type, or a combination thereof.

At block 425, the UE 115-*b* may receive, at a first bandwidth and during the TTI, the first control channel message, which may include a flag indicating the presence of a second control channel message and/or an indication of a second control channel message payload size. At block 427, the UE 115-*b* may determine, based on a flag in the first control channel message, whether a second control channel message is present in the TTI. In a further, optional (as indicated by the dashed line at block 430) aspect, the UE 115-*b* may, at block 430, identify the second control channel message based on the payload size indicated in the first control channel message. At block 435, the UE 115-*b* may receive the second control channel message in the same TTI as the TTI during which the first control channel message is received at step 415 (or a subsequent TTI). Or, in examples where no flag is present in the first control channel message or the flag has a value that indicates that the second control channel message is not present for the TTI, the UE 115-*b* may not receive the second control channel message at all.

Figure 5:
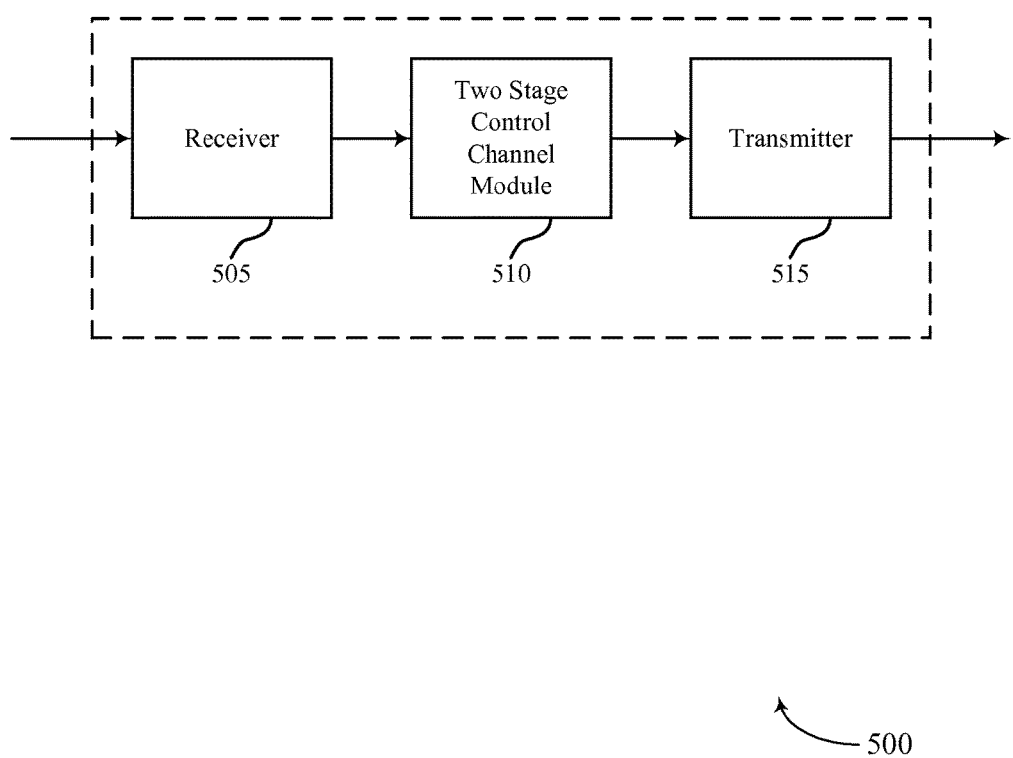
FIG. 5 shows a block diagram of a wireless device configured for two-stage PDCCH with DCI flag and DCI format size indicator with DCI flag and DCI format size indicator in accordance with various aspects of the present disclosure.

Turning next to FIG. 5, shown is a block diagram of a wireless device 500 configured for two-stage PDCCH with DCI flag and DCI format size indicator in accordance with various aspects of the present disclosure. Wireless device 500 may be an example of aspects of a UE 115 described with reference to FIGS. 1-4. Wireless device 500 may include a receiver 505, a two-stage control channel module 510, or a transmitter 515. Wireless device 500 may also include a processor. Each of these components may be in communication with one another.

The receiver 505 may receive information such as packets, user data, or control information associated with various information channels (e.g., control channels, data channels, and information related to two-stage PDCCH with DCI flag and DCI format size indicator, etc.). Information may be passed on to the two-stage control channel module 510, and to other components of wireless device 500. In some examples, the receiver 505 may receive the first control channel message in a TTI, for instance, at a first bandwidth. The receiver 505 may receive the second control channel message in the TTI or a subsequent TTI. As described above, the TTI may be a TTI of an eCC having symbols of shorter duration than symbols of another CC, such as a PCC.

In some examples, the receiver 505 may receive a first plurality of control channel messages based on the first control channel message format and a first transmission periodicity. In some examples, the receiver 505 may receive a second plurality of control channel messages based on a second control channel message format and a second transmission periodicity, where, in some examples, the first transmission periodicity is less than the periodicity of the second transmission periodicity. That is, in some examples, the receiver 505 may receive a fast PDCCH having certain DCI fields and transmitted at the first frequency, and the receiver 505 may receive a slow PDCCH having different DCI fields and transmitted at a different frequency (e.g., a second frequency different than the first frequency).

Furthermore, in some examples, receiver 505 may receive (e.g., from a base station) an aggregation level associated with communications during one or more TTIs. This aggregation level may indicate to the wireless device 500 the bandwidth or resource element locations that the wireless device 1500 (e.g., via receiver 505) should attempt to decode in the TTI to obtain the first control channel message. In other words, the aggregation level may provide one or more candidate bandwidths or resource elements at which the first control channel message may be received and decoded by the wireless device 1500. By utilizing this aggregation level, the wireless device 1500 may reduce the number of blind decodes required to decode control information relative to legacy LTE.

The two-stage control channel module 510 may, in conjunction with the receiver 505, receive a first control channel message in a TTI that includes a flag that indicates a presence of a second control channel message in the TTI and/or an indication of a second control channel message payload size. The two-stage control channel module 510 may thus determine, based on the flag in the first control channel message (or lack of a flag in the first control channel message), whether a second control channel message identify the second control channel message based on the payload size indicated in the first control channel message.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
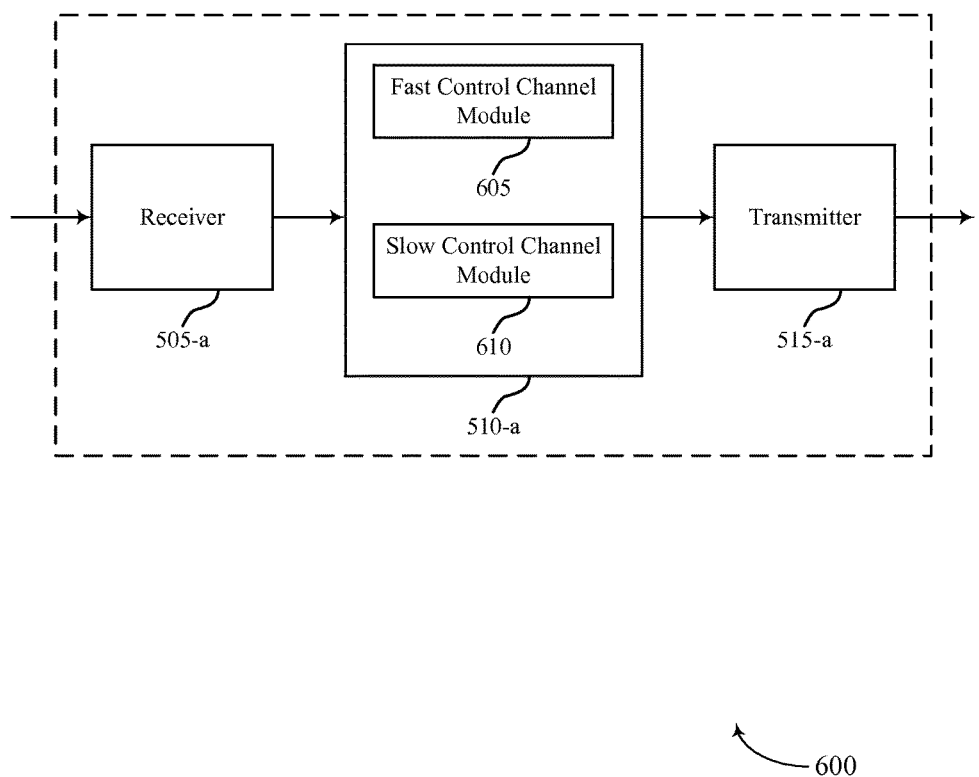
FIG. 6 shows a block diagram of a wireless device configured for two-stage PDCCH with DCI flag and DCI format size indicator with DCI flag and DCI format size indicator in accordance with various aspects of the present disclosure.

FIG. 6 shows a block diagram of a wireless device 600 for two-stage PDCCH with a DCI flag and a DCI format size indicator in accordance with various aspects of the present disclosure. Wireless device 600 may be an example of aspects of a wireless device 500 or a UE 115 described with reference to FIGS. 1-5. Wireless device 600 may include a receiver 505-*a*, a two-stage control channel module 510-*a*, or a transmitter 515-*a*. Wireless device 600 may also include a processor. Each of these components may be in communication with one another. The two-stage control channel module 510-*a* may also include a fast control channel module 605, and a slow control channel module 610.

The receiver 505-*a* may receive information which may be passed on to two-stage control channel module 510-*a*, and to other components of wireless device 600. The two-stage control channel module 510-*a* may perform the operations described above with reference to FIG. 5. The transmitter 515-*a* may transmit signals received from other components of wireless device 600.

The fast control channel module 605 may receive a first control channel message during a TTI, which may include a flag indicating whether a second control channel message is present in the TTI. In addition, the first control channel message may include an indication of a second control channel message payload size as described above with reference to FIGS. 2-4. The slow control channel module 610 may identify the second control channel message based, in whole or part, on the payload size indicated in the first control channel message as described above with reference to FIGS. 2-4.

Figure 7:
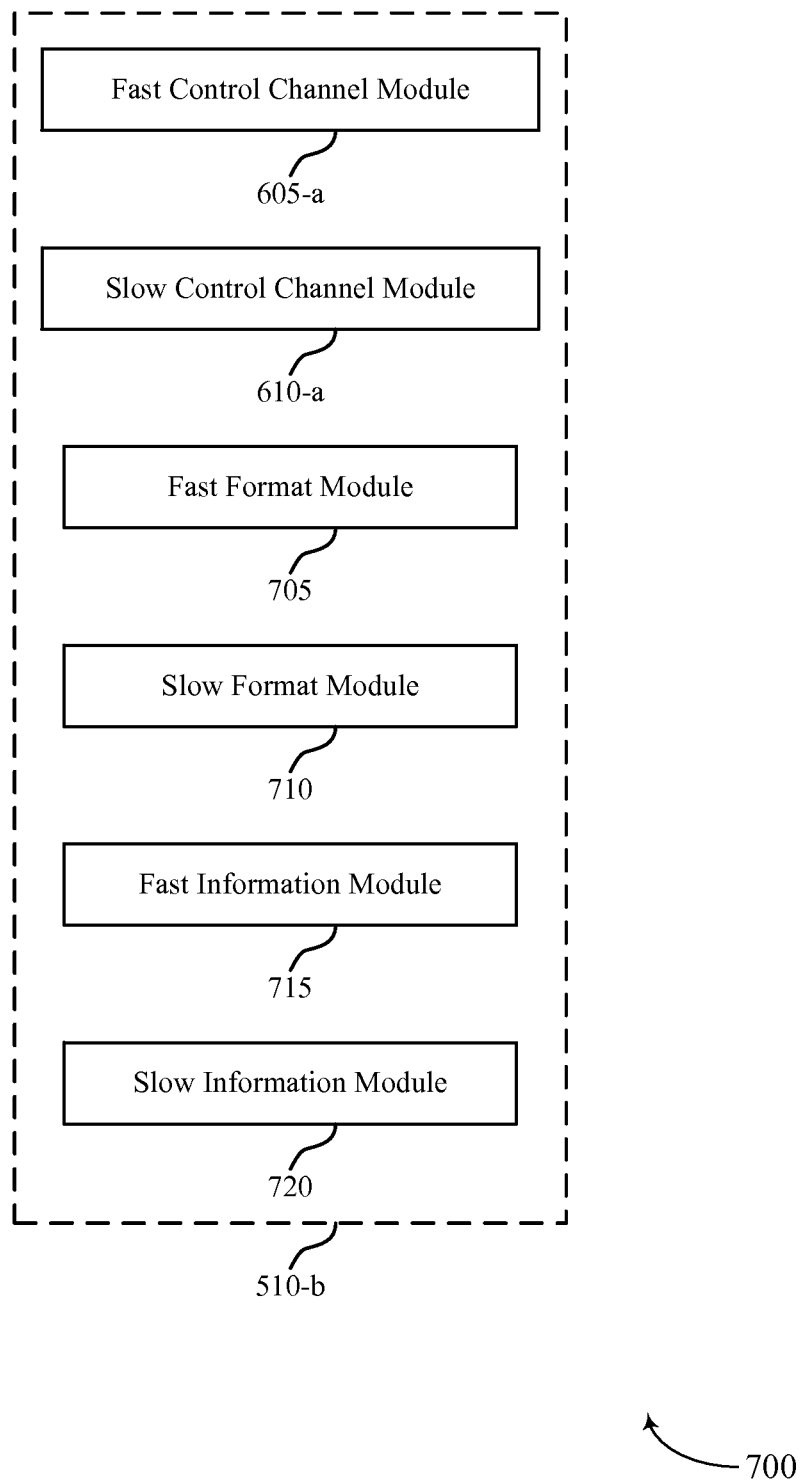
FIG. 7 shows a block diagram of a two-stage control channel module configured for two-stage PDCCH with DCI flag and DCI format size indicator with DCI flag and DCI format size indicator in accordance with various aspects of the present disclosure.

FIG. 7 shows a block diagram 700 of a two-stage control channel module 510-*b* for two-stage PDCCH with DCI flag and DCI format size indicator in accordance with various aspects of the present disclosure. The two-stage control channel module 510-*b* may be an example of aspects of a two-stage control channel module 510 described with reference to FIGS. 5-6. The two-stage control channel module 510-*b* may include a fast control channel module 605-*a* and a slow control channel module 610-*a*. Each of these modules may perform the functions described above with reference to FIG. 6. The two-stage control channel module 510-*b* may also include a fast format module 705, a slow format module 710, a fast information module 715, and a slow information module 720. Each of these modules may be in communication with one another.

The fast format module 705 may be configured to identify and receive a first control channel message having a first control channel message format, as described above with reference to FIGS. 2-4. In some examples, a payload size of a control channel message having the first control channel message format may be fixed from one TTI to a subsequent TTI. Additionally or alternatively, the indication in the first control channel message of the second control channel size may be two bits. In some examples, a combination of the two bits corresponds to one or more payload sizes.

The slow format module 710 may be configured to identify and receive a second control channel message having a second control channel message format, and the second control channel message format may be different from the first control channel message format, as described above with reference to FIGS. 2-4. In some examples, a payload of the second control channel message has more bits than a payload of the first control channel message. The second control channel message payload size may, for instance, be a function of a configured transmission mode.

The fast information module 715 may be configured to identify and parse a message having the first control channel message format (e.g., fast PDCCH), which may include a first set of information fields corresponding to a first update rate, as described above with reference to FIGS. 2-4. The first set of information fields may include HARQ information or MCS update information, for example.

The slow information module 720 may be configured to identify and parse a message having the second control channel message format (e.g., slow PDCCH), which may include a second set of information fields corresponding to a second update rate, as described above with reference to FIGS. 2-4. The second set of information fields may include MCS information, RI information, precoder information, coarse RB allocation information, CQI request information, or power control command information, for example. Additionally or alternatively, the indication of the second control channel message payload size may further indicate a payload type. In some examples, the payload type includes an RB allocation payload type, a MCS payload type, a CSI request payload type, or a combination thereof.

The components of wireless device 500, wireless device 600, or two-stage control channel module 510-*b* may each, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
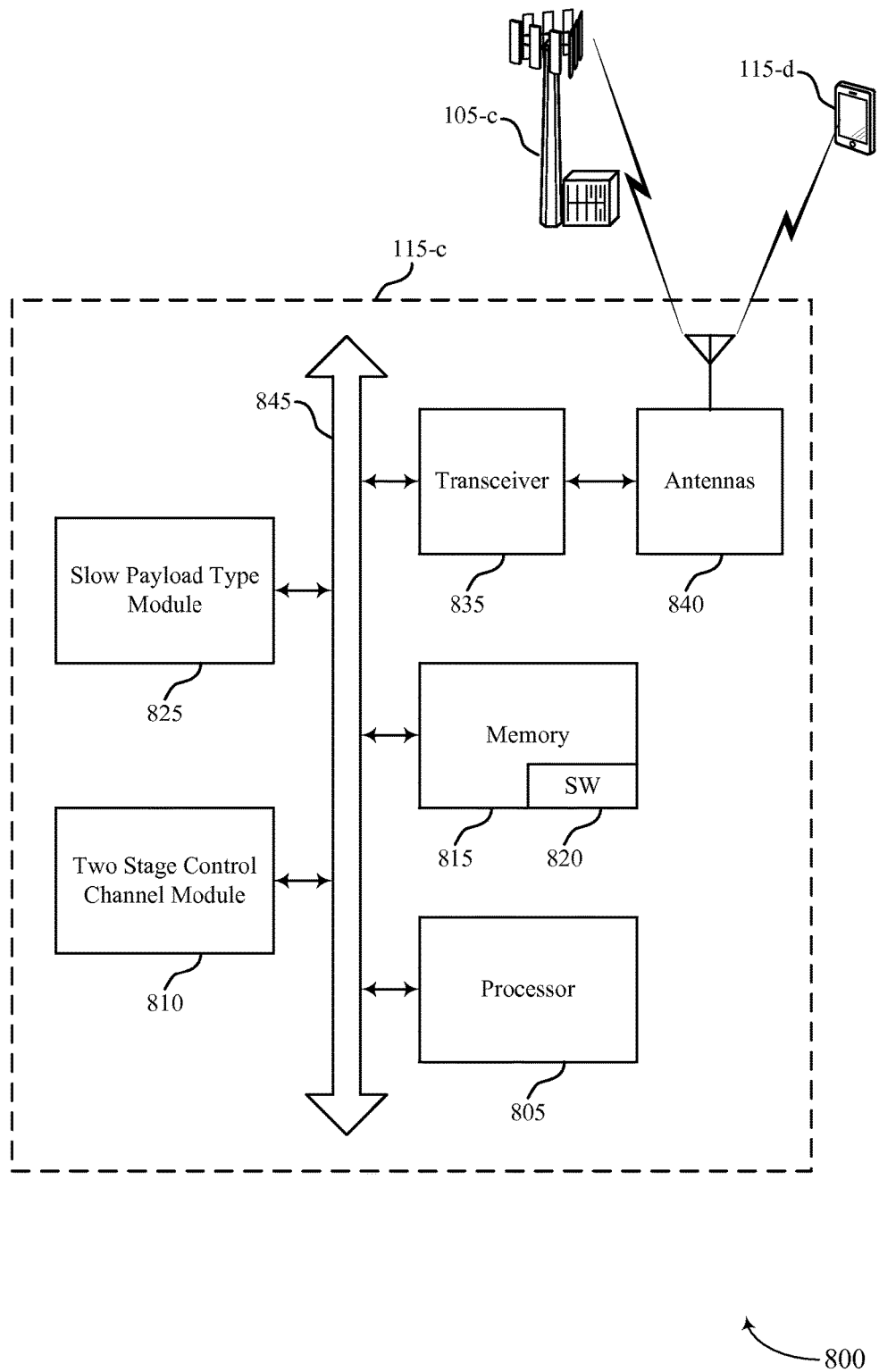
FIG. 8 illustrates a block diagram of a system including a UE configured for two-stage PDCCH with DCI flag and DCI format size indicator with DCI flag and DCI format size indicator in accordance with various aspects of the present disclosure.

FIG. 8 shows a diagram of a system 800 including a UE 115 configured for two-stage PDCCH with DCI flag and DCI format size indicator in accordance with various aspects of the present disclosure. System 800 may include UE 115-*c*, which may be an example of a wireless device 500, a wireless device 600, or a UE 115 described above with reference to FIGS. 1, 2 and 5-7. UE 115-*c* may include a two-stage control channel module 810, which may be an example of a two-stage control channel module 510 described with reference to FIGS. 5-7. UE 115-*c* may also include a slow payload type module 825. UE 115-*c* may include components for bi-directional voice and data communications including components for transmitting communications and components for receiving communications. For example, UE 115-*c* may communicate bi-directionally with base station 105-*c* or UE 115-*d*.

The slow payload type module 825 may be configured to identify and parse an indication of the second control channel message payload size, which may be received in a first control channel message, and which may further indicates a payload type, as described above with reference to FIGS. 2-4. The indication may be an SPIB, as described with reference to Tables 1-3, above. In some examples, the payload type includes a RB allocation payload type, a MCS payload type, a CSI request payload type, or a combination thereof.

UE 115-*c* may also include a processor module 805, and memory 815 (including software (SW) 820), a transceiver module 835, and one or more antennas 840, each of which may communicate, directly or indirectly, with one another (e.g., via buses 845). The transceiver module 835 may communicate bi-directionally, via the antennas 840 or wired or wireless links, with one or more networks, as described above. For example, the transceiver module 835 may communicate bi-directionally with a base station 105 or another UE 115. The transceiver module 835 may include a modem to modulate the packets and provide the modulated packets to the antennas 840 for transmission, and to demodulate packets received from the antennas 840. While UE 115-*c* may include a single antenna 840, UE 115-*c* may also have multiple antennas 840 capable of concurrently transmitting or receiving multiple wireless transmissions.

The memory 815 may include random access memory (RAM) and read only memory (ROM), which may be examples of non-transitory computer readable media. The memory 815 may store computer-readable, computer-executable software/firmware code 820 including instructions that, when executed, cause the processor module 805 to perform various functions described herein (e.g., two-stage PDCCH with a DCI flag and a DCI format size indicator, etc.). Alternatively, the software/firmware code 820 may not be directly executable by the processor module 805 but cause a computer (e.g., when compiled and executed) to perform functions described herein. The processor module 805 may include an intelligent hardware device, (e.g., a central processing unit (CPU), a microcontroller, an ASIC, etc.)

Figure 9:
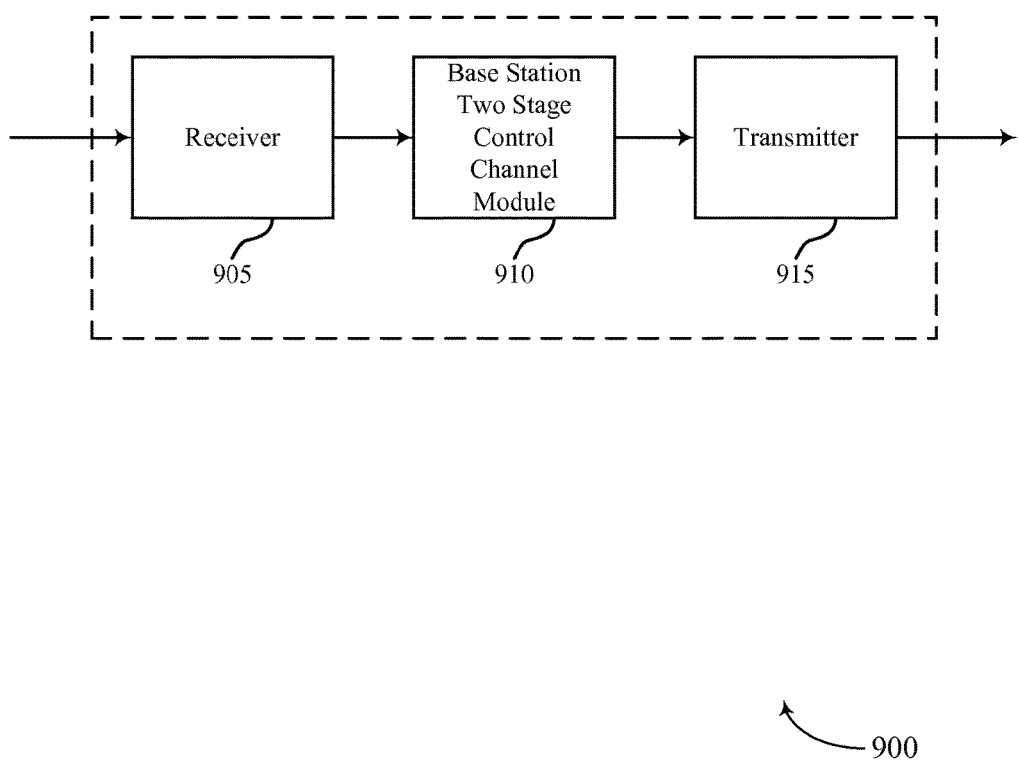
FIG. 9 shows a block diagram of a wireless device configured for two-stage PDCCH with DCI flag and DCI format size indicator with DCI flag and DCI format size indicator in accordance with various aspects of the present disclosure.

FIG. 9 shows a block diagram of a wireless device 900 configured for two-stage PDCCH with a DCI flag and a DCI format size indicator in accordance with various aspects of the present disclosure. Wireless device 900 may be an example of aspects of a base station 105 described with reference to FIGS. 1-4 and 8. Wireless device 900 may include a receiver 905, a base station two-stage control channel module 910, or a transmitter 915. Wireless device 900 may also include a processor. Each of these components may be in communication with one another.

The receiver 905 may receive information such as packets, user data, or control information associated with various information channels (e.g., control channels, data channels, and information related to two-stage PDCCH with DCI flag and DCI format size indicator, etc.). Information may be passed on to the base station two-stage control channel module 910, and to other components of wireless device 900.

The base station two-stage control channel module 910 may be configured to determine whether to add a flag to a first control channel message in a TTI based on whether a second control channel message is to be transmitted during the TTI. In addition, based on such a determination, the two-stage control channel module 910 may configure and/or generate the first control channel message, which may include configuring and/or generating the flag, and in some examples, an indication of a second control channel message payload size and adding the flag and/or indication to the first control channel message for transmission to one or more UEs. The base station two-stage control channel module 910 may also configure the second control channel message based on the payload size indicated in the first control channel message.

The transmitter 915 may transmit signals received from other components of wireless device 900. In some example, the transmitter 915 may be collocated with the receiver 905 in a transceiver module. The transmitter 915 may include a single antenna, or it may include a plurality of antennas. In some examples, the transmitter 915 may transmit, at a first bandwidth, the first control channel message in a TTI. In an aspect, the first bandwidth may be a uniform or static bandwidth across multiple TTIs. In addition, the transmitter 915 may transmit the second control channel message at a second bandwidth (e.g., different from the first bandwidth) in the same TTI (or a subsequent TTI). In an aspect, the second bandwidth may be offset from a static first bandwidth of the first bandwidth over which the first control channel message is transmitted by a bandwidth offset value (or, simply, a "bandwidth offset"). In some examples, the bandwidth offset may be uniform across multiple TTIs, which allows the UE 115 to identify the second bandwidth based on the static first bandwidth. The TTI may be a TTI of an eCC having symbols of shorter duration than symbols of another CC.

Furthermore, in some examples, transmitter 915 may transmit an aggregation level associated with one or more TTIs. This aggregation level may indicate to a UE the bandwidth or resource element locations that the UE should attempt to decode in the TTI to obtain the first control channel message. In other words, the aggregation level may provide one or more candidate bandwidths or resource elements at which the first control channel message may be received and decoded by the UE. By utilizing this aggregation level, the UE may reduce the number of blind decodes required to decode control information relative to legacy LTE.

In some examples, the transmitter 915 may transmit a first plurality of control channel messages based on the first control channel message format and a first transmission periodicity. Additionally or alternatively, the transmitter 915 may transmit a second plurality of control channel messages based on a second control channel message format and a second transmission periodicity, where the first transmission periodicity is less than the periodicity of the second transmission periodicity.

Figure 10:
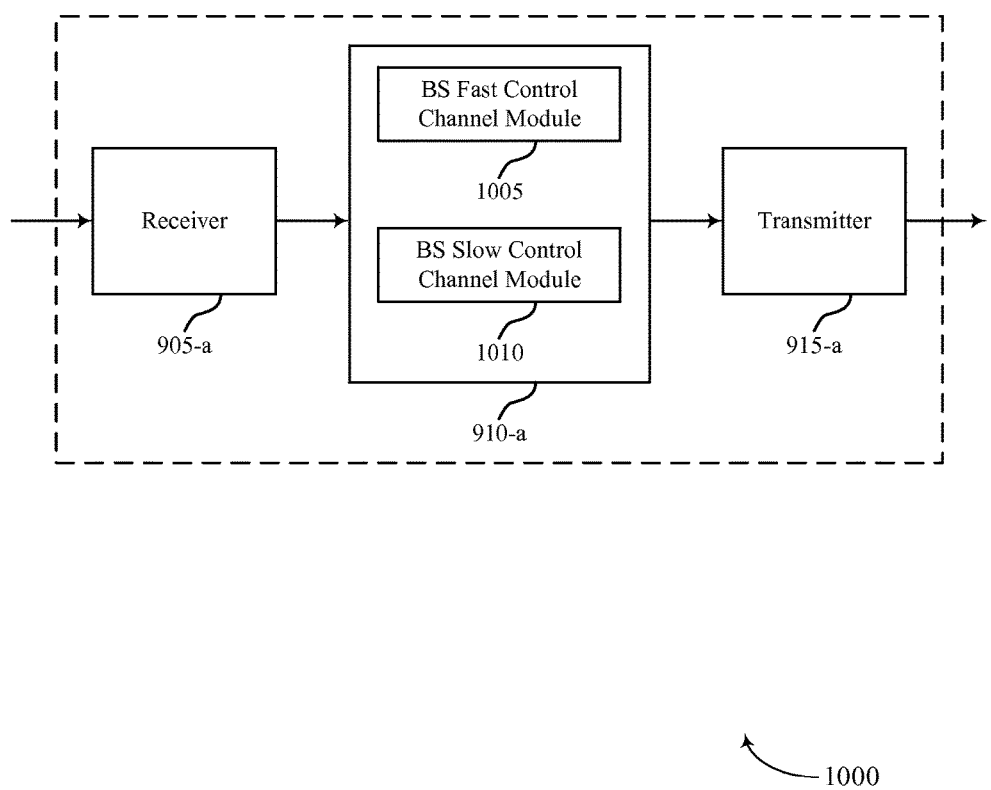
FIG. 10 shows a block diagram of a wireless device configured for two-stage PDCCH with DCI flag and DCI format size indicator with DCI flag and DCI format size indicator in accordance with various aspects of the present disclosure.

FIG. 10 shows a block diagram of a wireless device 1000 for two-stage PDCCH with a DCI flag and a DCI format size indicator in accordance with various aspects of the present disclosure. Wireless device 1000 may be an example of aspects of a wireless device 900 or a base station 105 described with reference to FIGS. 1-4, 8, and 9. Wireless device 1000 may include a receiver 905-*a*, a base station two-stage control channel module 910-*a*, or a transmitter 915-*a*. Wireless device 1000 may also include a processor. Each of these components may be in communication with each other. The base station two-stage control channel module 910-*a* may also include a BS fast control channel module 1005 and a BS slow control channel module 1010.

The receiver 905-*a* may receive information which may be passed on to base station two-stage control channel module 910-*a*, and to other components of wireless device 1000. The base station two-stage control channel module 910-*a* may perform the operations described above with reference to FIG. 9. The transmitter 915-*a* may transmit signals received from other components of wireless device 1000.

The BS fast control channel module 1005 may be configured to determine whether to add a flag to a first control channel message in a TTI, for instance, based on whether a second control channel message is to be transmitted during the TTI. Such a determination may include, for instance, determining that values of one or more information fields associated with the second control channel message require updating from previously transmitted values of these one or more information fields. In addition, BS fast control channel module 1005 may configure the first control channel message (e.g., fast PDCCH) with the flag indicating that the second control channel message is to be transmitted during the TTI. In some examples, the BS fast control channel module 1005 may also configure the first control channel message with an indication of a second control channel message payload size as described above with reference to FIGS. 2-4. The BS slow control channel module 1010 may also configure the second control channel message (e.g., slow PDCCH) based, wholly or partially, on the payload size indicated, or to be indicated, in the first control channel message as described above with reference to FIGS. 2-4.

Figure 11:
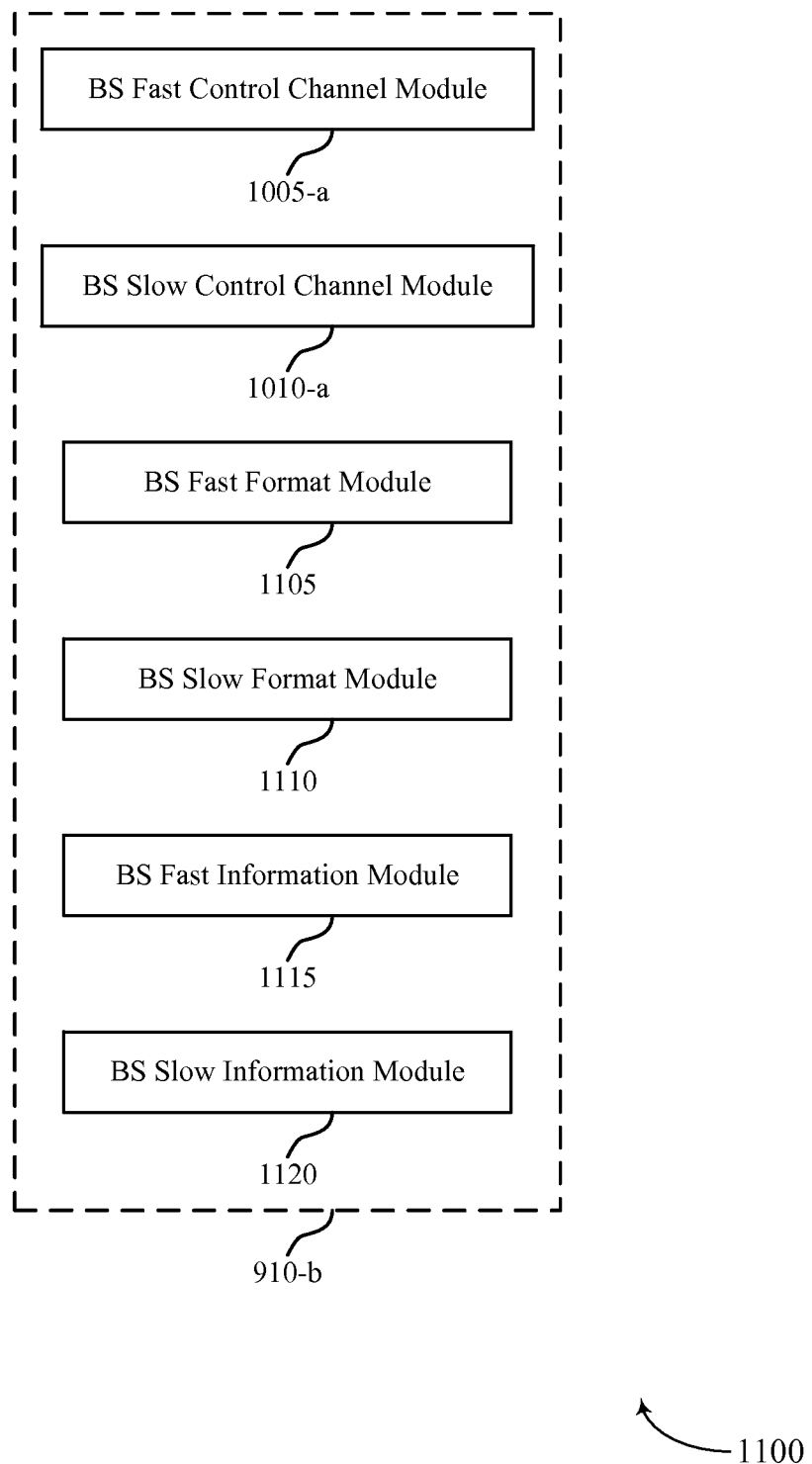
FIG. 11 shows a block diagram of a base station two-stage control channel module for two-stage PDCCH with DCI flag and DCI format size indicator in accordance with various aspects of the present disclosure.

FIG. 11 shows a block diagram 1100 of a base station two-stage control channel module 910-*b* for two-stage PDCCH with DCI flag and DCI format size indicator in accordance with various aspects of the present disclosure. The base station two-stage control channel module 910-*b* may be an example of aspects of a base station two-stage control channel module 910 described with reference to FIGS. 9-10. The base station two-stage control channel module 910-*b* may include a BS fast control channel module 1005-*a* and a BS slow control channel module 1010-*a*. Each of these modules may perform the functions described above with reference to FIG. 10. The base station two-stage control channel module 910-*b* may also include a BS fast format module 1105, a BS slow format module 1110, a BS fast information module 1115, and a BS slow information module 1120. Each of the components of the base station two-stage control channel module 910-*b* may be in communication with one another.

The BS fast format module 1105 may configure control channel message with a first control channel message format for transmission according to a first transmission periodicity, as described above with reference to FIGS. 2-4. The BS slow format module 1110 may configure control channel message with a second control channel message format according to a second transmission periodicity, as described above with reference to FIGS. 2-4.

The BS fast information module 1115 may configure control channel messages with a first control channel message format, which may include a first set of information fields corresponding to a first update rate, as described above with reference to FIGS. 2-4. The BS slow information module 1120 may configure control channel messages with a second control channel message forma, which may include a second set of information fields corresponding to a second update rate, as described above with reference to FIGS. 2-4.

The BS fast format module 1105 and BS slow format module 1110 may thus, in combination with other BS fast information module 1115 and the BS slow information module 1120, split a PDCCH, or employ a two-stage PDCCH configuration.

The components of wireless device 900, wireless device 1000, or base station two-stage control channel module 910-*b* may each, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 12:
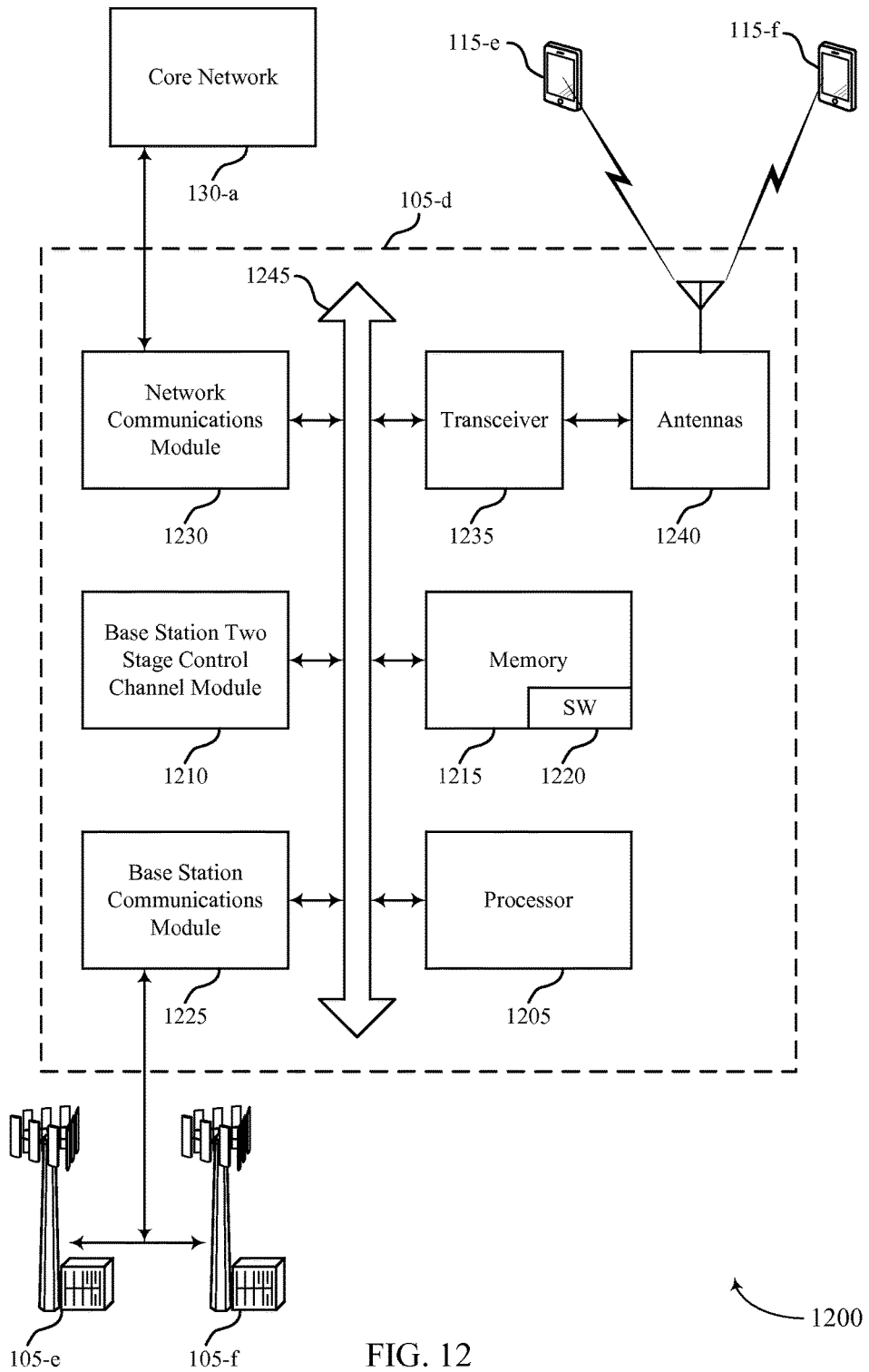
FIG. 12 illustrates a block diagram of a system including a base station configured for two-stage PDCCH with DCI flag and DCI format size indicator in accordance with various aspects of the present disclosure.

FIG. 12 shows a diagram of a system 1200 including a base station 105 configured for two-stage PDCCH with DCI flag and DCI format size indicator in accordance with various aspects of the present disclosure. System 1200 may include base station 105-*d*, which may be an example of a wireless device 900, a wireless device 1000, or a base station 105 described above with reference to FIGS. 1, 2, and 9-11. Base Station 105-*d* may include a base station two-stage control channel module 1210, which may be an example of a base station two-stage control channel module 910 described with reference to FIGS. 9-11. Base Station 105-*d* may also include components for bi-directional voice and data communications including components for transmitting communications and components for receiving communications. For example, base station 105-*d* may communicate bi-directionally with UEs 115-*e* and 115-*f*.

In some cases, base station 105-*d* may have one or more wired backhaul links. Base station 105-*d* may have a wired backhaul link (e.g., S1 interface, etc.) to the core network 130-*a*. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communication module 1225. In some examples, base station communication module 1225 may provide an X2 interface within an LTE/LTE-A wireless communication network technology to provide communication between some of the base stations 105. In some examples, base station 105-*d* may communicate with other base stations through core network 130-*a*. In some cases, base station 105-*d* may communicate with the core network 130-*a* through network communications module 1230.

The base station 105-*d* may include a processor module 1205, memory 1215 (including software (SW) 1220), transceiver modules 1235, and antennas 1240, which each may be in communication, directly or indirectly, with one another (e.g., over bus system 1245). The transceiver modules 1235 may be configured to communicate bi-directionally, via the antennas 1240, with the UEs 115, which may be multi-mode devices. The transceiver module 1235 (or other components of the base station 105-*d*) may also be configured to communicate bi-directionally, via the antennas 1240, with one or more other base stations (not shown). The transceiver module 1235 may include a modem configured to modulate the packets and provide the modulated packets to the antennas 1240 for transmission, and to demodulate packets received from the antennas 1240. The base station 105-*d* may include multiple transceiver modules 1235, each with one or more associated antennas 1240. The transceiver module may be an example of a combined receiver 905 and transmitter 915 of FIG. 9.

The memory 1215 may include RAM and ROM, which may be examples of non-transitory computer-readable media. The memory 1215 may also store computer-readable, computer-executable software code 1220 containing instructions that are configured to, when executed, cause the processor module 1210 to perform various functions described herein (e.g., two-stage PDCCH with DCI flag and DCI format size indicator, selecting coverage enhancement techniques, call processing, database management, message routing, etc.). Alternatively, the software 1220 may not be directly executable by the processor module 1205 but be configured to cause the computer, e.g., when compiled and executed, to perform functions described herein. The processor module 1205 may include an intelligent hardware device, e.g., a CPU, a microcontroller, an ASIC, etc. The processor module 1205 may include various special purpose processors such as encoders, queue processing modules, base band processors, radio head controllers, digital signal processor (DSPs), and the like.

The base station communication module 1225 may manage communications with other base stations 105. The communications management module may include a controller or scheduler for controlling communications with UEs 115 in cooperation with other base stations 105. For example, the base station communication module 1225 may coordinate scheduling for transmissions to UEs 115 for various interference mitigation techniques such as beamforming or joint transmission.

Figure 13:
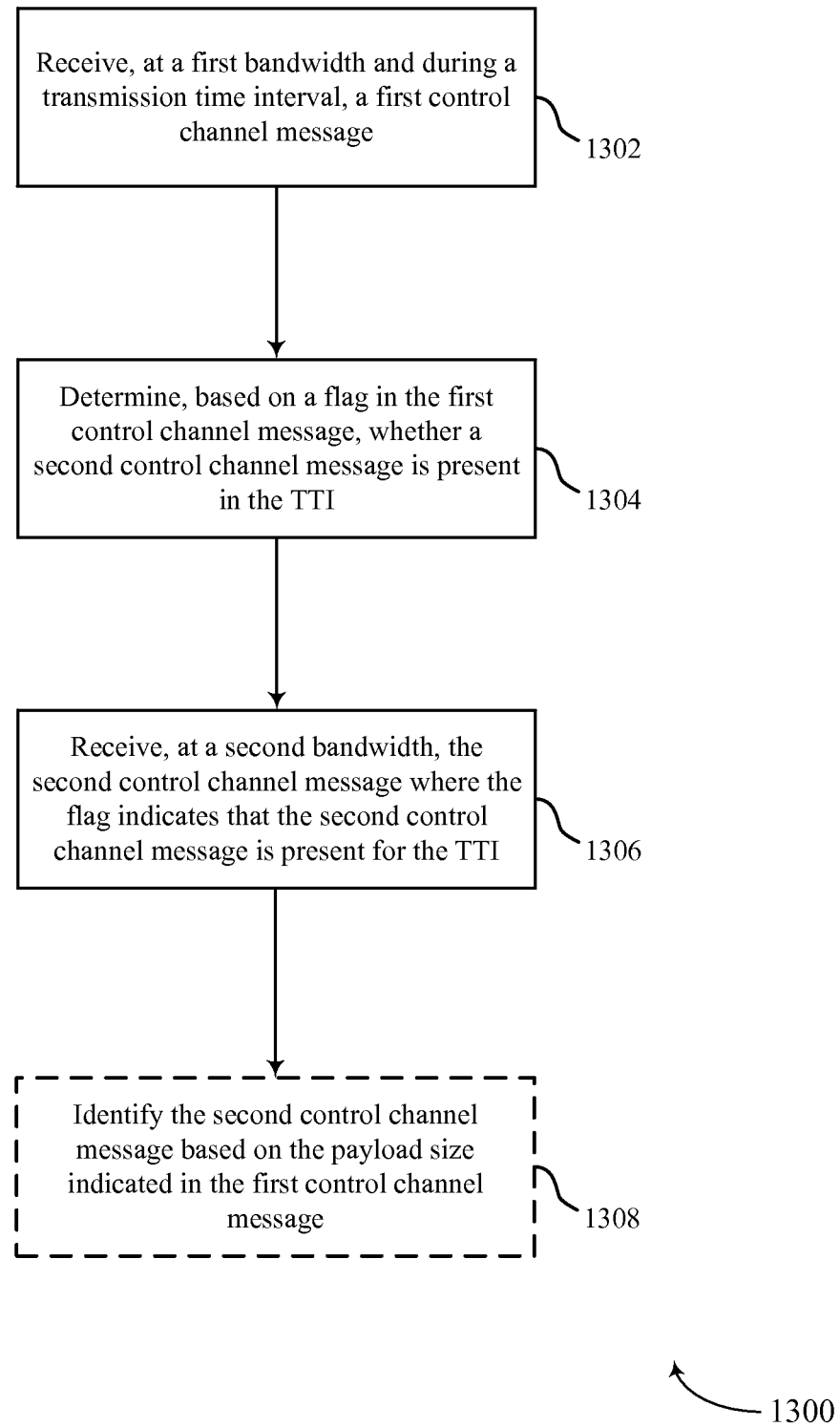
FIG. 13 shows a flowchart illustrating a method for two-stage PDCCH with DCI flag and DCI format size indicator in accordance with various aspects of the present disclosure.

FIG. 13 shows a flowchart illustrating a method 1300 for two-stage PDCCH with DCI flag and DCI format size indicator in accordance with various aspects of the present disclosure. The operations of method 1300 may be implemented by a UE 115 or its components as described with reference to FIGS. 1-8. For example, the operations of method 1300 may be performed by the two-stage control channel module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1302, the UE 115 may receive, at a first bandwidth and during a transmission time interval, a first control channel message, as described above with reference to FIGS. 2-4. In certain examples, the operations of block 1302 may be performed by the fast control channel module 605 as described above with reference to FIG. 6.

At block 1304, the UE 115 may determine, based on a flag in the first control channel message, whether a second control channel message is present in the TTI, as described above with reference to FIGS. 2-4. In certain examples, the operations of block 1304 may be performed by the fast control channel module 605 as described above with reference to FIG. 6.

At block 1306, the UE 115 may receive, at a second bandwidth, the second control channel message where the flag indicates that the second control channel message is present for the TTI, as described above with reference to FIGS. 2-4. In an aspect, the second bandwidth may be offset from a static first bandwidth of the first bandwidth over which the first control channel message is transmitted by a bandwidth offset value (or, simply, a "bandwidth offset"). In some examples, the bandwidth offset may be uniform across multiple TTIs, which allows the UE 115 to identify the second bandwidth based on the static first bandwidth. In certain examples, the operations of block 1306 may be performed by the slow control channel module 610 as described above with reference to FIG. 6. In an additional optional aspect, method 1300 may include utilizing control information from a previously received (e.g., a most recently received) second control channel message for the TTI where the first control channel message indicates that the second control channel message is not present for the TTI. In some examples, the control information from the previously received second control channel message may be stored in a memory and utilized for a TTI where the first control channel message indicates that control information in the second control channel message is not included in a particular TTI.

Furthermore, in an optional aspect (as indicated by the dashed lines of block 1308), at block 1308, the UE 115 may identify the second control channel message based on the payload size indicated in the first control channel message, as described above with reference to FIGS. 2-4. In certain examples, the operations of block 1308 may be performed by the slow control channel module 610 as described above with reference to FIG. 6.

Figure 14:
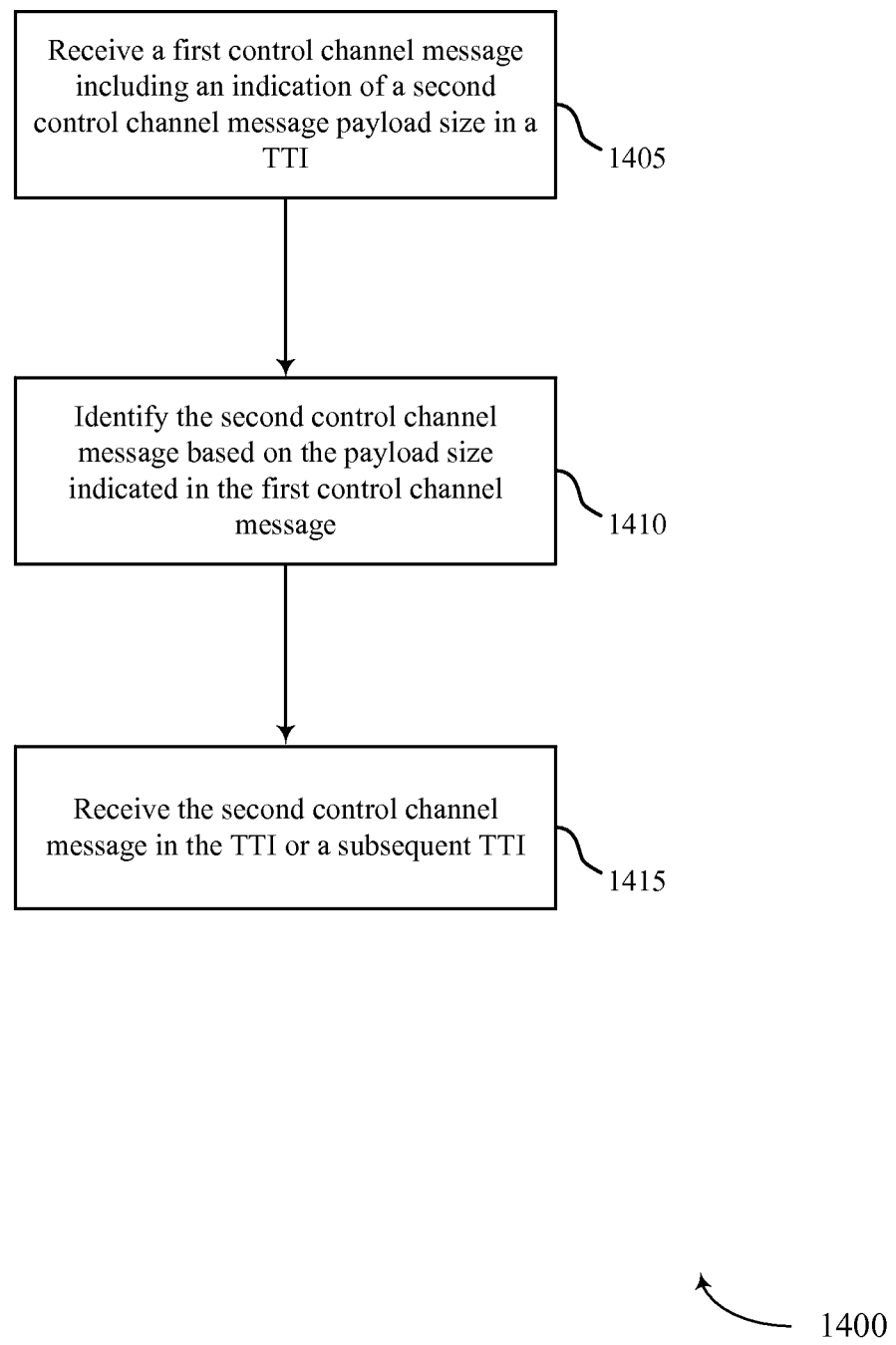
FIG. 14 shows a flowchart illustrating a method for two-stage PDCCH with DCI flag and DCI format size indicator in accordance with various aspects of the present disclosure.

FIG. 14 shows a flowchart illustrating a method 1400 for two-stage PDCCH with DCI flag and DCI format size indicator in accordance with various aspects of the present disclosure. The operations of method 1400 may be implemented by a UE 115 or its components as described with reference to FIGS. 1-8. For example, the operations of method 1400 may be performed by the two-stage control channel module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may receive, in a TTI, a first control channel message that includes an indication of a second control channel message payload size, as described above with reference to FIGS. 2-4. In some examples, the first control channel message may be received at a first bandwidth that may be uniform across multiple TTIs. Furthermore, in some examples, the UE 115 may receive (e.g., in a message received prior to receiving the first control channel message) an aggregation level associated with the TTI. This aggregation level may indicate to a UE the bandwidth or resource element locations that the UE should attempt to decode in the TTI to obtain the first control channel message. In other words, the aggregation level may provide one or more candidate bandwidths or resource elements at which the first control channel message may be received and decoded by the UE. In certain examples, the operations of block 1405 may be performed by the receiver 505 as described above with reference to FIG. 5.

At block 1410, the UE 115 may identify the second control channel message based on the payload size indicated in the first control channel message, as described above with reference to FIGS. 2-4. In certain examples, the operations of block 1410 may be performed by the slow control channel module 610 as described above with reference to FIG. 6.

At block 1415, the UE 115 may receive the second control channel message in the TTI or a subsequent TTI, as described above with reference to FIGS. 2-4. In certain examples, the operations of block 1415 may be performed by the receiver 505 as described above with reference to FIG. 5.

Figure 15:
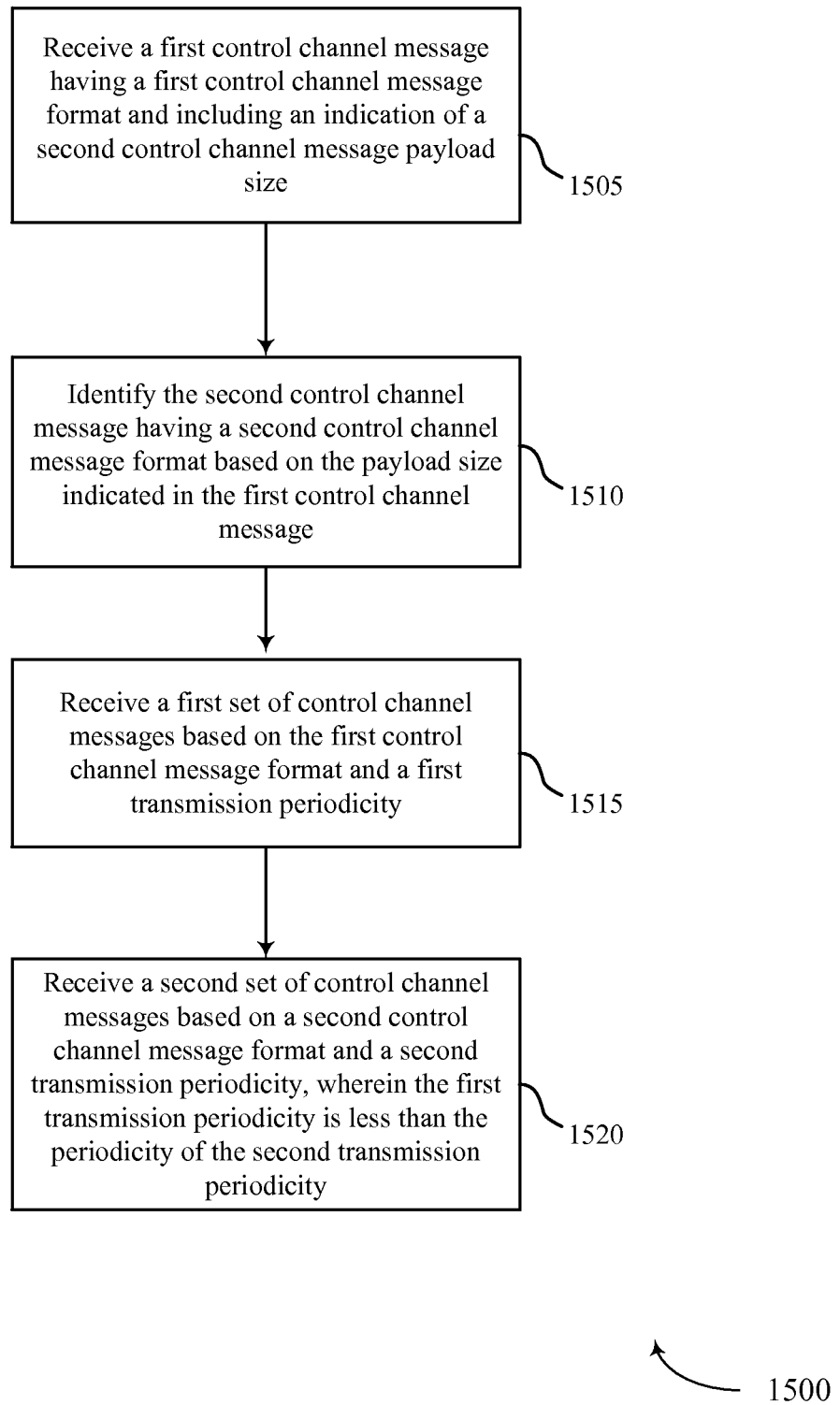
FIG. 15 shows a flowchart illustrating a method for two-stage PDCCH with DCI flag and DCI format size indicator in accordance with various aspects of the present disclosure.

FIG. 15 shows a flowchart illustrating a method 1500 for two-stage PDCCH with DCI flag and DCI format size indicator in accordance with various aspects of the present disclosure. The operations of method 1500 may be implemented by a UE 115 or its components as described with reference to FIGS. 1-8. For example, the operations of method 1500 may be performed by the two-stage control channel module 510 or the receiver 505 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300 and 1400 of FIGS. 13 and 14.

At block 1505, the UE 115 may receive a first control channel message having a first control channel message format and including an indication of a second control channel message payload size as described above with reference to FIGS. 2-4. In certain examples, the operations of block 1505 may be performed by receiver 505 as described above with reference to FIG. 5.

At block 1510, the UE 115 may identify the second control channel message having a second control channel message format based on the payload size indicated in the first control channel message, as described above with reference to FIGS. 2-4. In certain examples, the operations of block 1510 may be performed by the slow control channel module 610 as described above with reference to FIG. 6.

At block 1515, the UE 115 may receive a first plurality of control channel messages based on the first control channel message format and a first transmission periodicity, as described above with reference to FIGS. 2-4. In certain examples, the operations of block 1515 may be performed by the receiver 505 as described above with reference to FIG. 5.

At block 1520, the UE 115 may receive a second plurality of control channel messages based on a second control channel message format and a second transmission periodicity, where the first transmission periodicity is less than the periodicity of the second transmission periodicity as described above with reference to FIGS. 2-4. In certain examples, the operations of block 1520 may be performed by the receiver 505 as described above with reference to FIG. 5.

Figure 16:
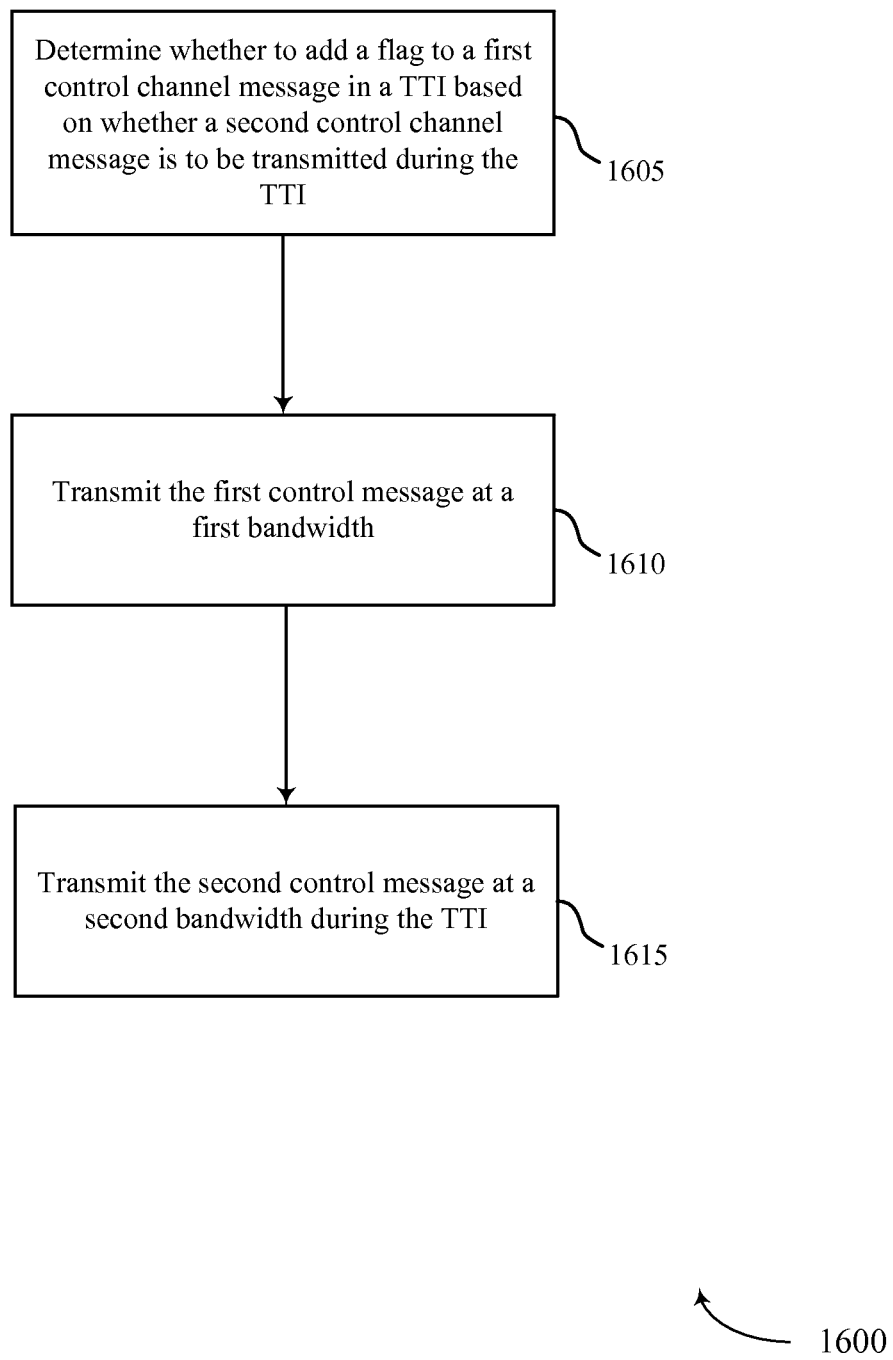
FIG. 16 shows a flowchart illustrating a method for two-stage PDCCH with DCI flag and DCI format size indicator in accordance with various aspects of the present disclosure.

FIG. 16 shows a flowchart illustrating a method 1600 for two-stage PDCCH with DCI flag and DCI format size indicator in accordance with various aspects of the present disclosure. The operations of method 1600 may be implemented by a base station 105 or its components as described with reference to FIGS. 1-4 and 9-12. For example, the operations of method 1600 may be performed by the base station two-stage control channel module 910 or transmitter 915-a as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1605, the base station 105 may determine whether to add a flag to a first control channel message in a TTI based on whether a second control channel message is to be transmitted during the TTI, as described above with reference to FIGS. 2-4. In an aspect, such a determination may be based on whether values of one or more information fields associated with the second control channel message necessitates updating of the one or more information fields that were previously transmitted in a previous second control channel message in a previous TTI. In certain examples, the operations of block 1605 may be performed by the BS fast control channel module 1005 as described above with reference to FIG. 10.

At block 1610, the base station 105 may transmit the first control channel message at a first bandwidth, as described above with reference to FIGS. 2-4. In some examples, base station 105 may transmit (e.g., in a message transmitted before the first control channel message) an aggregation level associated with one or more TTIs, which may indicate the first bandwidth to the UE. In certain examples, the operations of block 1610 may be performed by transmitter 915-a as described above with reference to FIG. 10.

Figure 17:
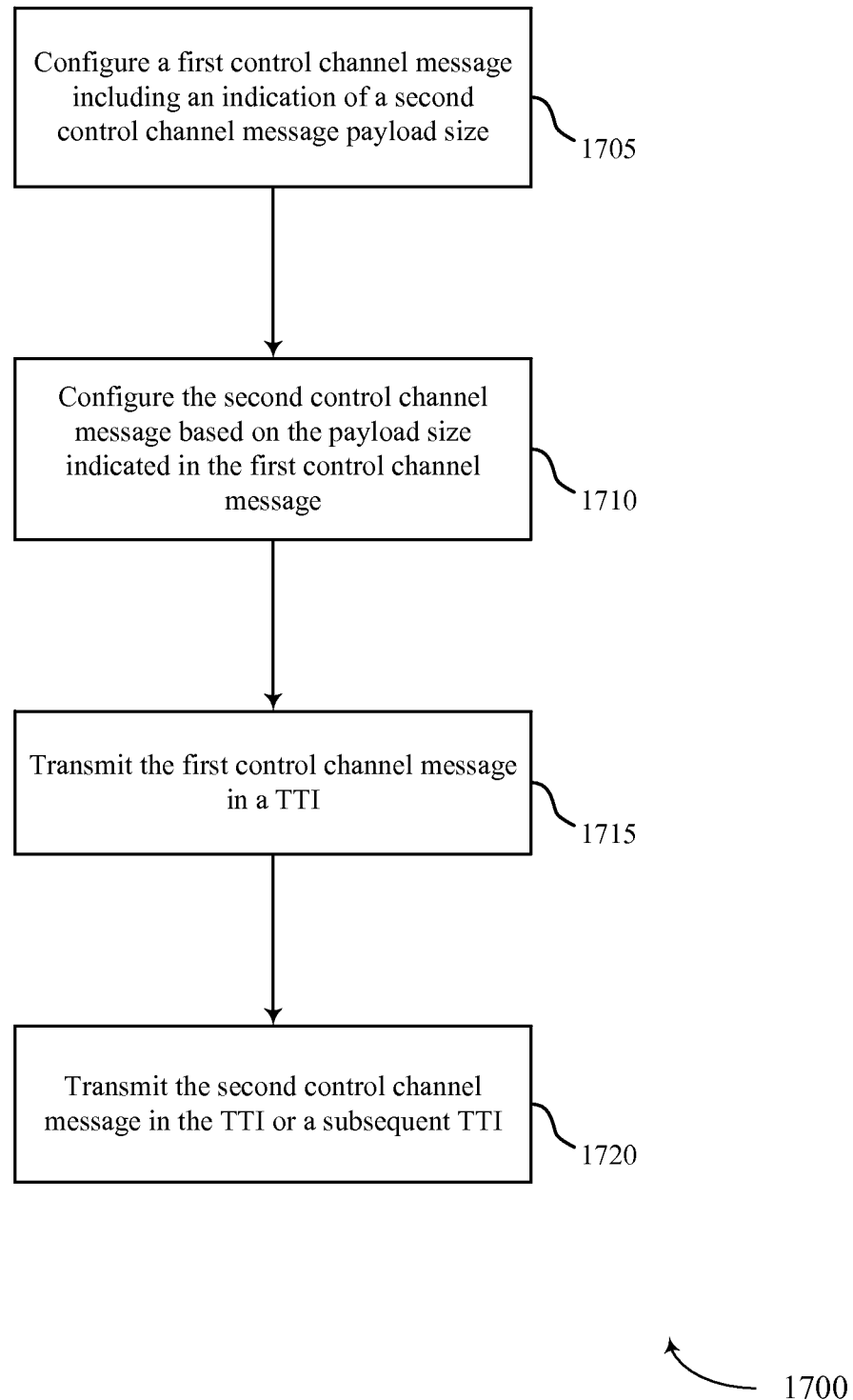
FIG. 17 shows a flowchart illustrating a method for two-stage PDCCH with DCI flag and DCI format size indicator in accordance with various aspects of the present disclosure.

FIG. 17 shows a flowchart illustrating a method 1700 for two-stage PDCCH with DCI flag and DCI format size indicator in accordance with various aspects of the present disclosure. The operations of method 1700 may be implemented by a base station 105 or its components as described with reference to FIGS. 1-4 and 9-12. For example, the operations of method 1700 may be performed by the base station two-stage control channel module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of method 1600 of FIG. 16.

At block 1705, the base station 105 may configure a first control channel message, including an indication of a second control channel message payload size, as described above with reference to FIGS. 2-4. In certain examples, the operations of block 1705 may be performed by the BS fast control channel module 1005 as described above with reference to FIG. 10.

At block 1710, the base station 105 may configure the second control channel message based at least in part on the payload size indicated in the first control channel message, as described above with reference to FIGS. 2-4. In certain examples, the operations of block 1710 may be performed by the BS slow control channel module 1010 as described above with reference to FIG. 10.

At block 1715, the base station 105 may transmit the first control channel message in a TTI, as described above with reference to FIGS. 2-4. In certain examples, the operations of block 1715 may be performed by the transmitter 915 as described above with reference to FIG. 9.

At block 1720, the base station 105 may transmit the second control channel message in the TTI or a subsequent TTI, as described above with reference to FIGS. 2-4. In certain examples, the operations of block 1720 may be performed by the transmitter 915 as described above with reference to FIG. 9.

Figure 18:
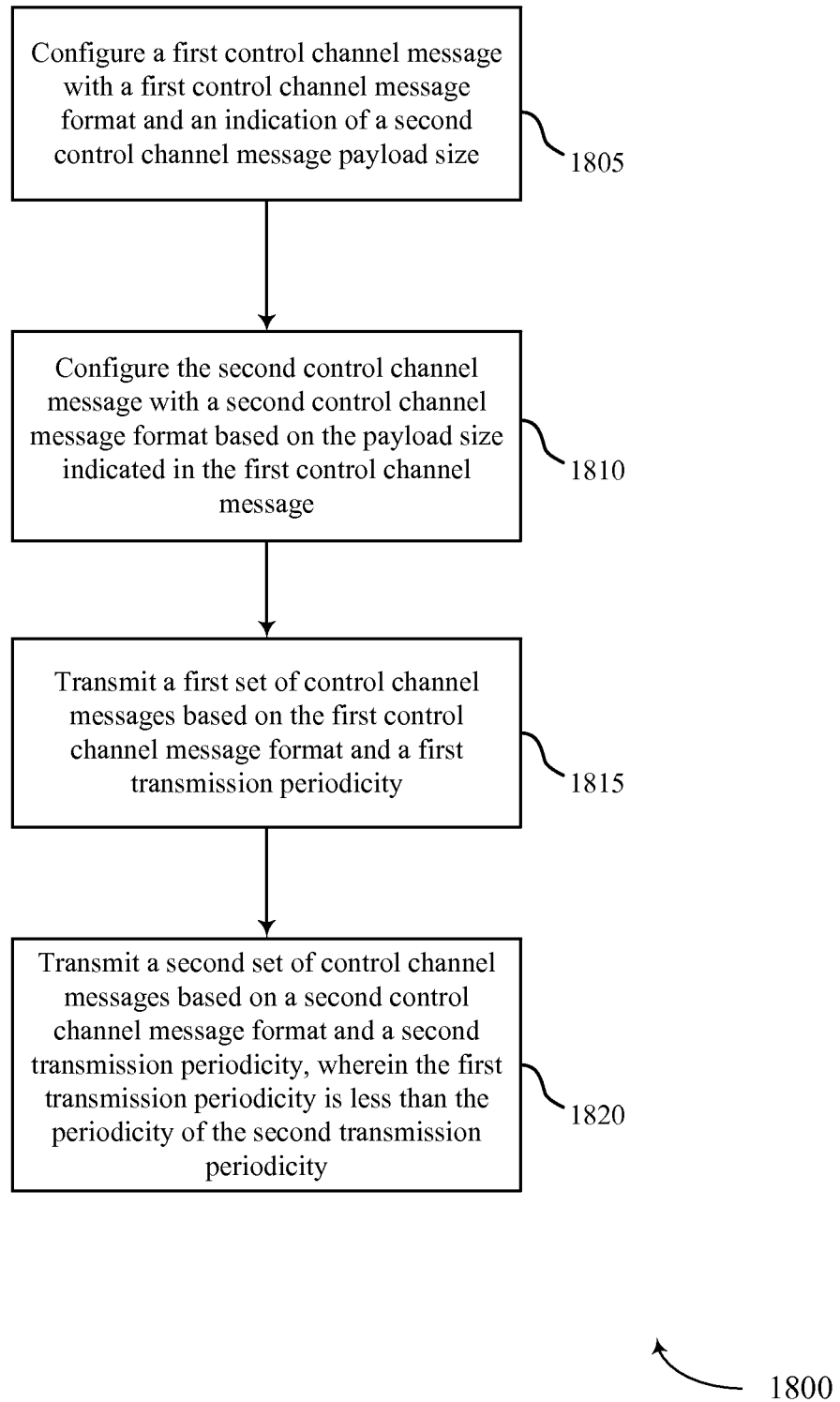
FIG. 18 shows a flowchart illustrating a method for two-stage PDCCH with DCI flag and DCI format size indicator in accordance with various aspects of the present disclosure.

FIG. 18 shows a flowchart illustrating a method 1800 for two-stage PDCCH with DCI flag and DCI format size indicator in accordance with various aspects of the present disclosure. The operations of method 1800 may be implemented by a base station 105 or its components as described with reference to FIGS. 1-4 and 9-12. For example, the operations of method 1800 may be performed by the base station two-stage control channel module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of methods 1600 and 1700 of FIGS. 16 and 17.

At block 1805, the base station 105 may configure a first control channel message with a first control channel message format and an indication of a second control channel message payload size, as described above with reference to FIGS. 2-4. In certain examples, the operations of block 1805 may be performed by the BS fast control channel module 1005 as described above with reference to FIG. 10.

At block 1810, the base station 105 may configure the second control channel message with a second control channel message format and based on the payload size indicated in the first control channel message, as described above with reference to FIGS. 2-4. In certain examples, the operations of block 1810 may be performed by the BS slow control channel module 1010 as described above with reference to FIG. 10.

At block 1815, the base station 105 may transmit a first plurality of control channel messages based on the first control channel message format and a first transmission periodicity, as described above with reference to FIGS. 2-4. In certain examples, the operations of block 1815 may be performed by the transmitter 915 as described above with reference to FIG. 9.

At block 1820, the base station 105 may transmit a second plurality of control channel messages based on a second control channel message format and a second transmission periodicity, where the first transmission periodicity is less than the periodicity of the second transmission periodicity, as described above with reference to FIGS. 2-4. In certain examples, the operations of block 1820 may be performed by the transmitter 915 as described above with reference to FIG. 9.

Methods 1300, 1400, 1500, 1600, 1700, and 1800 may thus provide for two-stage PDCCH with DCI flag and DCI format size indicator. It should be noted, however, that methods 1300, 1400, 1500, 1600, 1700, and 1800 describe possible implementation, and that the operations and the steps may be rearranged or otherwise modified such that other implementations are possible. In some examples, aspects from two or more of the methods 1300, 1400, 1500, 1600, 1700, and 1800 may be combined.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can be RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiplexing (FDM)A, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication performed by a user equipment (UE), comprising:
   determining an aggregation level associated with a first control channel message, wherein the aggregation level comprises a limitation on monitoring a search space by the UE for the first control channel message;
   monitoring the search space during a transmission time interval (TTI) for the first control channel message in accordance with the aggregation level;
   determining, based on the first control channel message, whether a second control channel message is present in the TTI, and a size or format of the second control message; and
   performing blind decoding for the second control channel message based on the size or format when the first control channel message indicates that the second control channel message is present in the TTI.

2. The method of claim 1, wherein the first control channel message includes an indication of a second control channel message payload size associated with the second control channel message, and further comprising identifying the second control channel message based at least in part on the second control channel message payload size.

3. The method of claim 2, wherein the second control channel message payload size is larger than a first control channel message payload size associated with the first control channel message.

4. The method of claim 2, wherein the indication of the second control channel message payload size comprises two bits.

5. The method of claim 4, wherein a combination of the two bits corresponds to one or more payload sizes.

6. The method of claim 2, wherein the second control channel message payload size is a function of a configured transmission mode.

7. The method of claim 2, wherein the indication of the second control channel message payload size further indicates a payload type.

8. The method of claim 7, wherein the payload type comprises a resource block (RB) allocation payload type, a modulation and coding scheme (MCS) payload type, a channel state information (CSI) request payload type, or a combination thereof.

9. The method of claim 1, wherein the TTI is a TTI of an enhanced component carrier (eCC) having symbols of shorter duration than symbols of another component carrier (CC).

10. The method of claim 1, wherein:
    the first control channel message comprises a first control channel message format; and
    the second control channel message comprises a second control channel message format, wherein the second control channel message format is different from the first control channel message format.

11. The method of claim 10, further comprising:
    receiving a first plurality of control channel messages based at least in part on the first control channel message format and a first transmission periodicity; and
    receiving a second plurality of control channel messages based at least in part on the second control channel message format and a second transmission periodicity, wherein the first transmission periodicity is less than the second transmission periodicity.

12. The method of claim 10, wherein:
    the first control channel message format comprises a first set of information fields corresponding to a first update rate; and
    the second control channel message format comprises a second set of information fields corresponding to a second update rate.

13. The method of claim 12, wherein the first set of information fields comprise hybrid automatic repeat request (HARQ) information or modulation and coding scheme (MCS) update information.

14. The method of claim 12, wherein the second set of information fields comprise MCS information, rank indicator (RI) information, precoder information, coarse resource block (RB) allocation information, channel quality indicator (CQI) request information, or power control command information.

15. The method of claim 10, wherein a payload size of a control channel message of the first control channel message format is fixed from one TTI to a subsequent TTI.

16. The method of claim 1, wherein the first bandwidth is fixed across a plurality of TTIs.

17. The method of claim 1, wherein the second bandwidth is offset from the first bandwidth by a bandwidth offset, wherein the bandwidth offset is fixed across a plurality of TTIs.

18. The method of claim 1, further comprising utilizing, for the TTI, control information from a previously received second control channel message in a previous TTI where the first control channel message indicates that the second control channel message is not present in the TTI.

19. A method of wireless communication performed by a base station, comprising:
    determining an aggregation level associated with a first control channel message, wherein the aggregation level comprises a limitation on a search space for the first control channel message;
    determining whether to include an indicator to a first control channel message in a transmission time interval (TTI) based on whether a second control channel message is to be transmitted during the TTI, wherein the indicator indicates a size or format of the second control message;
    transmitting the first control channel message in accordance with the aggregation level; and
    transmitting the second control channel message during the TTI in response to a determination that the indicator is included in the first control channel message.

20. The method of claim 19, wherein the size is a second control channel message payload size.

21. The method of claim 20, further comprising configuring the second control channel message based at least in part on the indicator indicating the second control channel message payload size.

22. The method of claim 20, wherein the second control channel message payload size is larger than a first control channel message payload size associated with the first control channel message.

23. The method of claim 19, wherein the indicator comprises two bits.

24. The method of claim 23, wherein a combination of the two bits corresponds to one or more payload sizes.

25. The method of claim 20, wherein the second control channel message payload size is a function of a configured transmission mode.

26. The method of claim 19, wherein the indicator indicates a payload type.

27. The method of claim 26, wherein the payload type comprises a resource block (RB) allocation payload type, a modulation and coding scheme (MCS) payload type, a channel state information (CSI) request payload type, or a combination thereof.

28. The method of claim 19, wherein the TTI is a TTI of an enhanced component carrier (eCC) having symbols of shorter duration than symbols of another component carrier (CC).

29. The method of claim 19, wherein:
    the first control channel message comprises a first control channel message format; and
    the second control channel message comprises a second control channel message format, wherein the second control channel message format is different from the first control channel message format.

30. The method of claim 29, further comprising:
    transmitting a first plurality of control channel messages based at least in part on the first control channel message format and a first transmission periodicity; and
    transmitting a second plurality of control channel messages based at least in part on the second control channel message format and a second transmission periodicity, wherein the first transmission periodicity is less than the second transmission periodicity.

31. The method of claim 29, wherein:
    the first control channel message format comprises a first set of information fields corresponding to a first update rate; and
    the second control channel message format comprises a second set of information fields corresponding to a second update rate.

32. The method of claim 31, wherein the first set of information fields comprise hybrid automatic repeat request (HARQ) information or modulation and coding scheme (MCS) update information.

33. The method of claim 31, wherein the second set of information fields comprise MCS information, rank indicator (RI) information, precoder information, coarse resource block (RB) allocation information, channel quality indicator (CQI) request information, or power control command information.

34. The method of claim 31, wherein a payload size of a control channel message of the first control channel message format is fixed from one TTI to a subsequent TTI.

35. The method of claim 19, wherein the first bandwidth is fixed across a plurality of TTIs.

36. The method of claim 19, wherein the second bandwidth is offset from the first bandwidth by a bandwidth offset, and wherein the bandwidth offset is fixed across a plurality of TTIs.

37. The method of claim 21, further comprising utilizing, for the TTI, control information from a previously received second control channel message in a previous TTI where the first control channel message indicates that the second control channel message is not present in the TTI.

38. An apparatus for wireless communication, comprising:
    means for determining an aggregation level associated with a first control channel message, wherein the aggregation level comprises a limitation on monitoring a search space by the apparatus for the first control channel message;
    means for monitoring the search space during a transmission time interval (TTI) for the first control channel message in accordance with the aggregation level;
    means for determining, based on the first control channel message, whether a second control channel message is present in the TTI, and a size or format of the second control message; and
    means for performing blind decoding for the second control channel message based on the size or format when the first control channel message indicates that the second control channel message is present in the TTI.

39. The apparatus of claim 38, wherein the first control channel message includes an indication of a second control channel message payload size associated with the second control channel message, and further comprising means for identifying the second control channel message based at least in part on the second control channel message payload size.

40. The apparatus of claim 38, further comprising means for utilizing, for the TTI, control information from a previously received second control channel message in a previous TTI where the first control channel message indicates that the second control channel message is not present in the TTI.

41. An apparatus for wireless communication, comprising:

means for determining an aggregation level associated with a first control channel message, wherein the aggregation level comprises a limitation on a search space for the first control channel message;

means for determining whether to include an indicator to a first control channel message in a transmission time interval (TTI) based on whether a second control channel message is to be transmitted during the TTI, wherein the indicator indicates a size or format of the second control message;

means for transmitting the first control channel message in accordance with the aggregation level; and means for transmitting the second control channel message during the TTI in response to a determination that the indicator is included in the first control channel message.

42. The apparatus of claim 41, wherein the size is a second control channel message payload size.

43. The apparatus of claim 42, further comprising means for configuring the second control channel message based at least in part on the indicator indicating the second control channel message payload size.

44. An apparatus for wireless communication, comprising:
a processor;
a memory in electronic communication with the processor; and
instructions stored in the memory, wherein the instructions are executable by the processor to:
determine an aggregation level associated with a first control channel message, wherein the aggregation level comprises a limitation on monitoring a search space by the apparatus for the first control channel message;
monitor the search space during a transmission time interval (TTI) for the first control channel message in accordance with the aggregation level;
determine, based on the first control channel message, whether a second control channel message is present in the TTI, and a size or format of the second control message; and
perform blind decoding for the second control channel message based on the size or format when the first control channel message indicates that the second control channel message is present in the TTI.

45. The apparatus of claim 44, wherein the first control channel message includes an indication of a second control channel message payload size associated with the second control channel message, and wherein the instructions are further executable by the processor to identify the second control channel message based at least in part on the second control channel message payload size.

46. The apparatus of claim 44, wherein the instructions are further executable by the processor to utilize, for the TTI, control information from a previously received second control channel message in a previous TTI where the first control channel message indicates that the second control channel message is not present in the TTI.

47. An apparatus for wireless communication, comprising:
a transmitter;
a processor;
a memory in electronic communication with the processor and the transmitter; and
instructions stored in the memory, wherein the instructions are executable by the processor to:

determine an aggregation level associated with a first control channel message, wherein the aggregation level comprises a limitation on a search space for the first control channel message;

determine whether to include an indicator to a first control channel message in a transmission time interval (TTI) based on whether a second control channel message is to be transmitted during the TTI, wherein the indicator indicates a size or format of the second control message;

transmit, via the transmitter, the first control channel message in accordance with the aggregation level; and transmit, via the transmitter, the second control channel message during the TTI in response to a determination that the indicator is included in the first control channel message.

48. The apparatus of claim 47, wherein the size is a second control channel message payload size.

49. The apparatus of claim 48, wherein the instructions are further executable by the processor to configure the second control channel message based at least in part on the indicator indicating the second control channel message payload size.

50. A non-transitory computer-readable medium storing code for wireless communication, the code comprising instructions executable to:
determine an aggregation level associated with a first control channel message, wherein the aggregation level comprises a limitation on monitoring a search space for the first control channel message;
monitor the search space during a transmission time interval (TTI) for the first control channel message in accordance with the aggregation level;
determine, based on the first control channel message, whether a second control channel message is present in the TTI, and a size or format of the second control message; and
perform blind decoding for the second control channel message based on the size or format when the first control channel message indicates that the second control channel message is present in the TTI.

51. The computer-readable medium of claim 50, wherein the first control channel message includes an indication of a second control channel message payload size associated with the second control channel message, and the code further comprising instructions executable to identify the second control channel message based at least in part on the second control channel message payload size.

52. The computer-readable medium of claim 50, the code further comprising instructions executable to utilize, for the TTI, control information from a previously received second control channel message in a previous TTI where the first control channel message indicates that the second control channel message is not present in the TTI.

53. A non-transitory computer-readable medium storing code for wireless communication, the code comprising instructions executable to:
determine an aggregation level associated with a first control channel message, wherein the aggregation level comprises a limitation on a search space for the first control channel message;
determine whether to include an indicator to a first control channel message in a transmission time interval (TTI) based on whether a second control channel message is to be transmitted during the TTI, wherein the indicator indicates a size or format of the second control message;

transmit the first control channel message in accordance with the aggregation level; and transmit the second control channel message during the TTI in response to a determination that the indicator is included in the first control channel message.

54. The computer-readable medium of claim 53, wherein the size is a second control channel message payload size.

55. The computer-readable medium of claim 54, the code further comprising instructions executable to configure the second control channel message based at least in part on the indicator indicating the second control channel message payload size.

* * * * *